United States Patent
Miyoshi et al.

(10) Patent No.: US 7,433,493 B1
(45) Date of Patent: Oct. 7, 2008

(54) ABNORMAL BEHAVIOR DETECTOR

(75) Inventors: Masanori Miyoshi, Mito (JP); Yoshiaki Usami, Hitachi (JP); Kazuya Takahashi, Hitachi (JP); Norito Watanabe, Hitachi (JP); Hideki Fujii, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 776 days.

(21) Appl. No.: 10/362,133

(22) PCT Filed: Sep. 6, 2000

(86) PCT No.: PCT/JP00/06053

§ 371 (c)(1),
(2), (4) Date: Feb. 21, 2003

(87) PCT Pub. No.: WO02/21441

PCT Pub. Date: Mar. 14, 2002

(51) Int. Cl.
*G06K 9/00* (2006.01)
(52) U.S. Cl. .................. 382/103; 382/154; 356/4.02
(58) Field of Classification Search .......... 382/103, 382/104, 106, 107, 123, 154, 168, 178, 181, 382/189, 203, 209, 232, 260, 274, 285, 291–295, 382/305, 276; 726/23; 706/62; 600/300; 180/169; 701/37; 715/863; 356/4.01, 4.02
See application file for complete search history.

(56) References Cited

U.S. PATENT DOCUMENTS

| | | | |
|---|---|---|---|
| 4,737,847 A | 4/1988 | Araki et al. | |
| 5,540,298 A * | 7/1996 | Yoshioka et al. | 180/169 |
| 5,671,142 A * | 9/1997 | Tatarazako | 701/37 |
| 6,028,626 A | 2/2000 | Aviv | |
| 6,212,510 B1 * | 4/2001 | Brand | 706/62 |
| 6,537,213 B2 * | 3/2003 | Dodds | 600/300 |
| 6,681,331 B1 * | 1/2004 | Munson et al. | 726/23 |
| 7,036,094 B1 * | 4/2006 | Cohen et al. | 715/863 |

FOREIGN PATENT DOCUMENTS

| | | |
|---|---|---|
| EP | 674977 | 10/1995 |
| JP | 63-253478 | 10/1988 |
| JP | 6-274786 * | 9/1994 |
| JP | 7-134767 | 5/1995 |
| JP | 10-154292 | 6/1998 |
| JP | 10-210456 | 8/1998 |
| JP | 10-314357 | 12/1998 |
| JP | 11-49100 | 2/1999 |
| JP | 11-252534 | 9/1999 |

* cited by examiner

*Primary Examiner*—Seyed Azarian
(74) *Attorney, Agent, or Firm*—Dickstein Shapiro LLP

(57) ABSTRACT

A technique for detecting an abnormal behavior by monitoring moving objects such as human being and a car. The place where the abnormal behavior of the moving objects occurs is deduced from the position of the moving object and the direction in which the moving object moves and presented to the car. An abnormal detector comprises means for determining the position of the moving object and the direction in which the moving object moves, means for determining the place where an abnormal incident causing an abnormal behavior of the moving object occurs on the basis of the determined position and direction, and means for displaying the place where the abnormal incident occurs. Therefore it is possible to immediately know the cause of the abnormal behavior of the moving object from the video information collected by observation monitoring moving objects such as a human being and a car.

6 Claims, 23 Drawing Sheets

HARDWARE CONFIGURATION

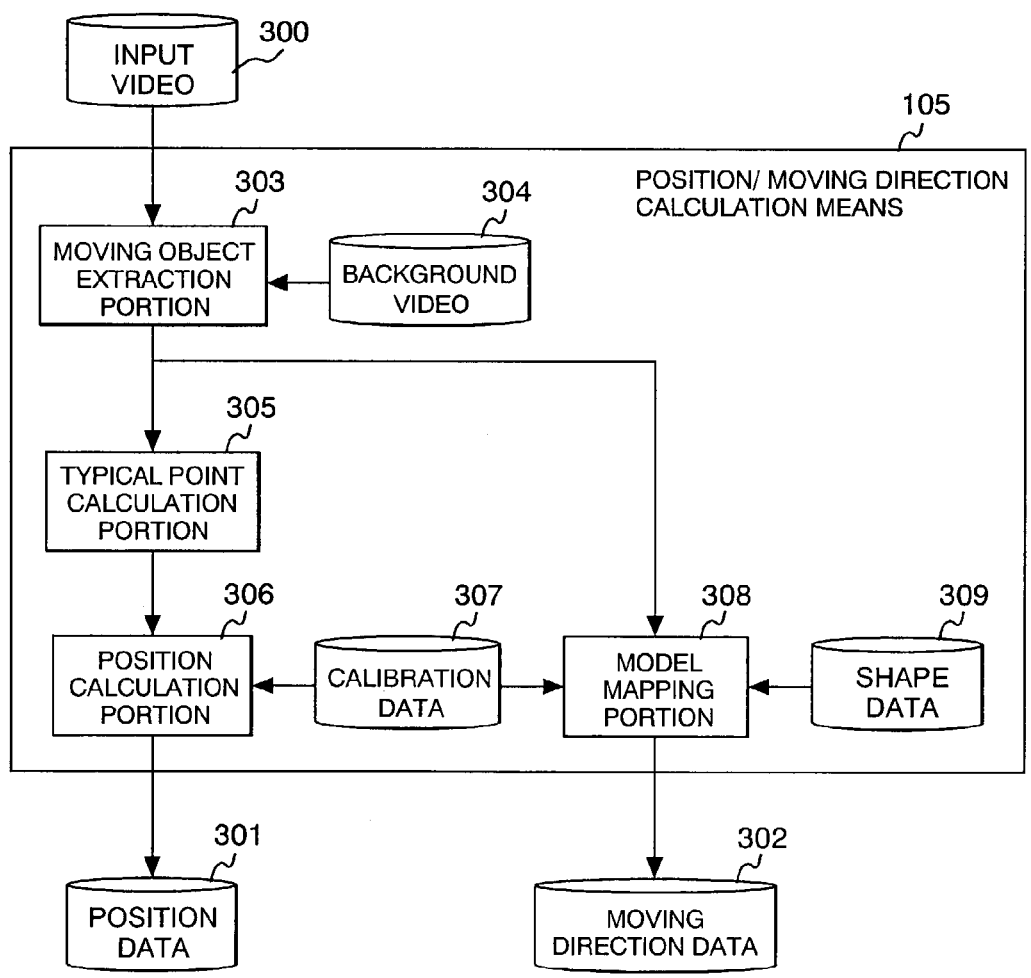

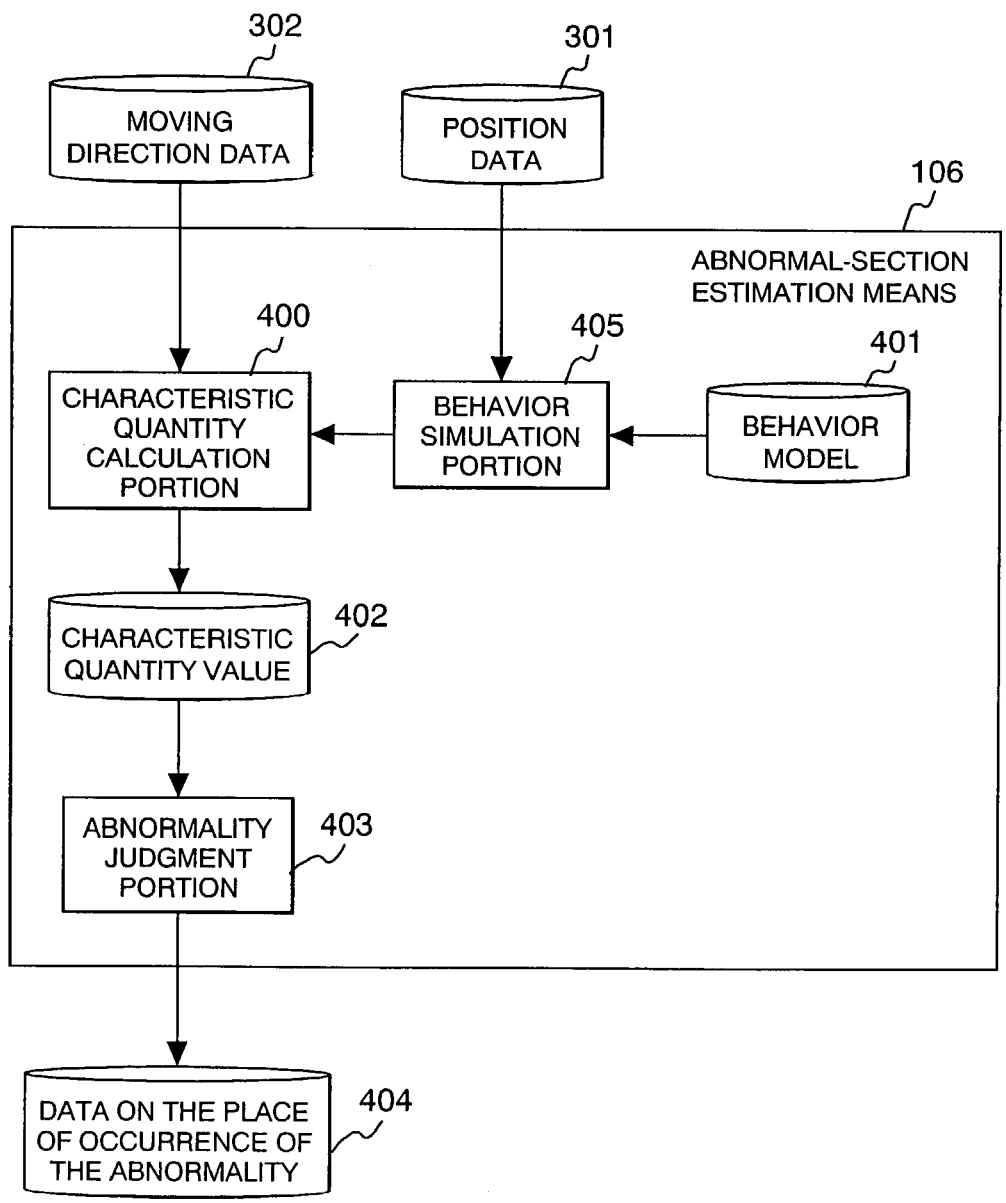

AN EXAMPLE OF THE BEHAVIOR MODEL

AN EXAMPLE OF CHARACTERISTIC QUANTITY DATA

TOTAL PROCESSING FLOW IN THE DETECTOR

FLOW OF POSITION/ MOVING DIRECTION CALCULATION

FLOW OF ESTIMATION OF WHERE THE ABNORMALITY HAS OCCURRED

ESTIMATION OF CHARACTERISTIC QUANTITIES

FLOW OF PROCESSING WITH THE STEEPEST DESCENT METHOD

CALCULATION OF THE MOVING DIRECTION FROM THE PATH

INTERNAL CONFIGURATION OF THE ABNORMAL-SECTION ESTIMATION MEANS FOR USING A PLURALITY OF BEHAVIOR MODELS

BLOCK DIAGRAM OF GAME ANALYZING SYSTEM

SYNTHETIC OUTPUT OF ACTUAL VIDEO AND
THE PLACE OF OCCURRENCE OF THE ABNORMALITY

SYNTHETIC OUTPUT OF CG VIDEO AND
THE PLACE OF OCCURRENCE OF THE ABNORMALITY

EXAMPLES OF DISPLAY OF CHARACTERISTIC QUANTITIES

ZOOMED-UP DISPLAY OF WHERE THE ABNORMALITY OCCURRED

GUIDANCE DISPLAY FOR SWITCHING FROM THE MONITORING
PLACE TO THE PLACE OF OCCURRENCE OF THE ABNORMALITY

EXTENSION OF THE SCOPE OF APPLICATION OF MOVING OBJECTS

SMOOTHENING OF CHARACTERISTIC QUANTITY DATA

FLOW OF PROCESSING FOR DETERMINING THE MOVING
DIRECTION BY THE DEGREE OF ATTRACTIVENESS

ABNORMAL BEHAVIOR DETECTOR

FIELD OF THE INVENTION

The present invention relates to an apparatus for monitoring a plurality of moving objects such as human beings and automobiles, and detecting the abnormal behavior of these moving objects.

BACKGROUND OF THE INVENTION

As set forth in Japanese Application Patent Laid-Open Publication No. Hei 07-134767, the art for conducting judgments based on the path information of persons that has been obtained using a video camera is known as a method of judging whether the behavior of persons is abnormal. The above-mentioned prior art assumes that the normal paths of persons are free from changes in velocity and acceleration, and judges that the behavior having significant changes in such terms is abnormal.

The above art, however, is intended only to judge whether the behavior itself of persons is abnormal, and does not enable the estimation of the cause or place of abnormal behavior. For example, if an unusual smell occurs in a place and causes the surrounding persons to behave abnormally, although the abnormality of the behavior of these persons can be judged, the place where the unusual smell that has caused the abnormality cannot be estimated.

In order to solve this problem, Japanese Application Patent Laid-Open Publication No. Hei 06-274786 discloses the art for estimating the place of occurrence of the event which has caused the abnormal behavior of the automobiles moving on a road. According to this method, for example, if a stone falls down onto the road, the place of occurrence of the abnormality (namely, the falling stone) can be estimated from the movements of the automobiles taking an avoiding action. That is to say, this method in which the traffic of automobiles is measured using a video camera estimates that the cause of the above-mentioned abnormal behavior of automobiles is present at a place small in their traffic or a place in which their traffic changes significantly.

Under the above prior art, the path of the automobiles moving on the road is accumulated for a fixed time and then the abnormal section is estimated from the frequency distribution obtained. For this reason, there has been the problem that abnormal sections cannot be estimated from momentary information relating to moving objects.

An object of the present invention is to provide a monitoring apparatus that automatically estimates, by using momentary information on moving objects, the place where the abnormal behavior of the moving objects has been caused.

SUMMARY OF THE INVENTION

In the present invention, the place of occurrence of abnormality is estimated from the momentary positions of moving objects and the moving directions of these objects. In order to achieve this, the apparatus pertaining to the present invention has a means for calculating the positions and moving directions of moving objects, a means for detecting, from these calculated positions and moving directions, the place of occurrence of the abnormality which causes the abnormality of the moving objects, and a means for displaying the detected place of occurrence of the abnormality.

BRIEF DESCRIPTION OF THE DRAWINGS

FIG. 3 is a block diagram showing the internal configuration of the position/moving direction calculation means in the present invention.

FIG. 4 is a block diagram showing the internal configuration of the abnormality origin estimation means in the present invention.

DETAILED DESCRIPTION OF THE PREFERRED EMBODIMENTS

Embodiments of the present invention are described in detail below using figures.

Figure 1:
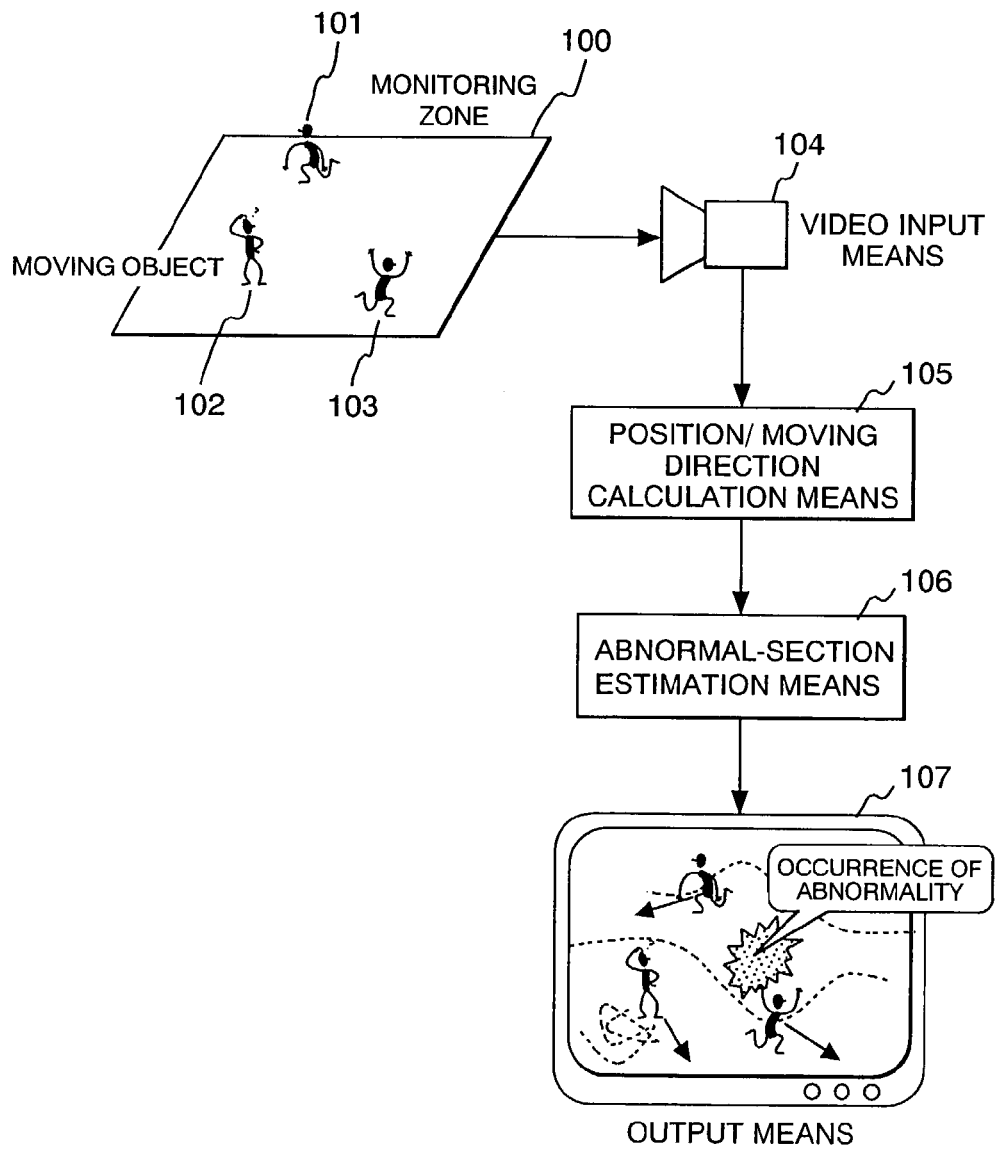
FIG. 1 is a block diagram showing the functional configuration of the abnormal behavior detector pertaining to the present invention.

FIG. 1 shows the total functional configuration of the abnormal behavior detector pertaining to the present invention. Monitoring zone 100 is a zone in the real world of monitoring with the detector. Moving objects 101 to 103 in this zone are monitored. Video input means 104 is a video data acquisition unit such as a video camera, and acquires video data on the monitoring zone 100. Position/moving direction calculation means 105 calculates the position and moving direction of each moving object from the video data that has been acquired by video input means 104. Means 106 for estimating the place of occurrence of abnormality (hereinafter, this means is referred to as abnormality origin estimation means 106) judges whether abnormality is occurring in the monitoring zone 100, by using information on the positions and moving directions that have been calculated by position/moving direction calculation means 105, and if abnormality is actually occurring, estimates the place where it is occurring. Output means 107 is a display unit, by which the place of occurrence of abnormality that has been estimated by the abnormality origin estimation means 106 is displayed to alert the user of the detector to the abnormality.

Figure 2:
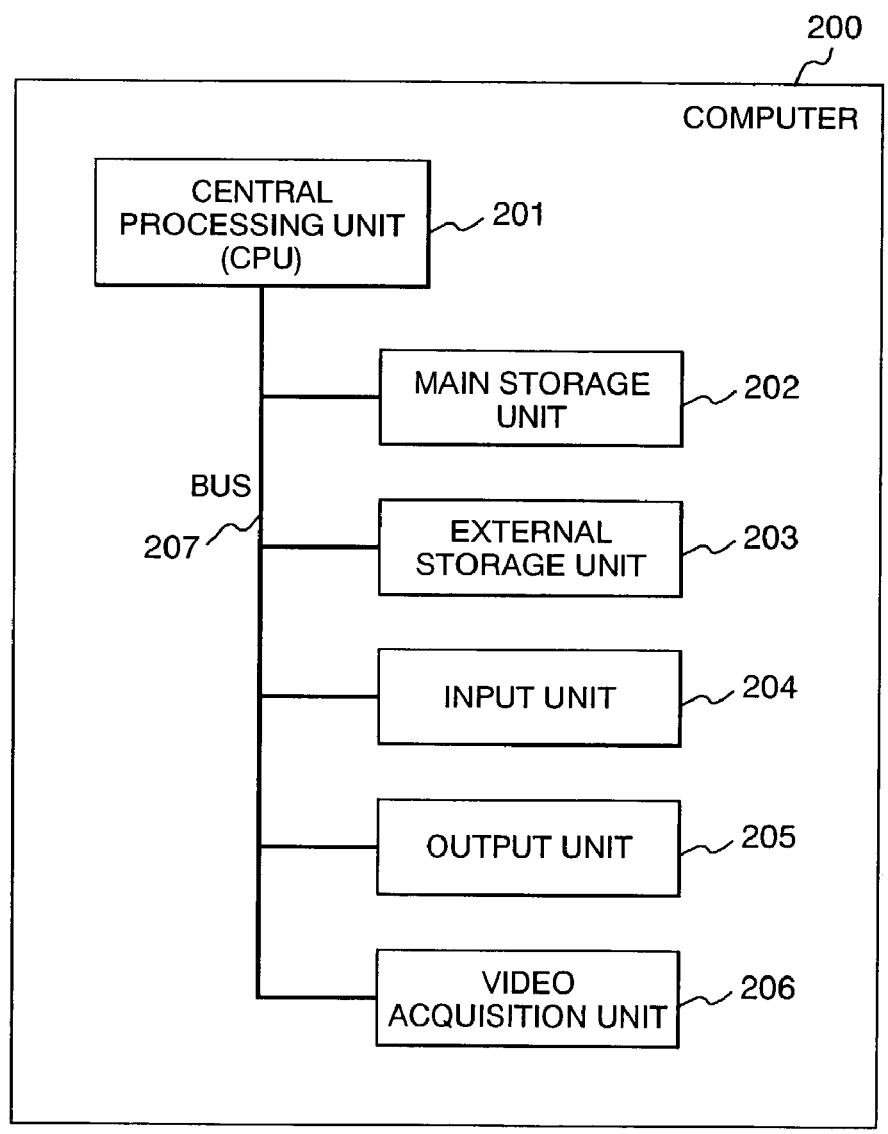
FIG. 2 is a block diagram showing the hardware configuration of the abnormal behavior detector pertaining to the present invention.

FIG. 2 shows an example of the hardware configuration of the abnormal behavior detector pertaining to the present invention. The abnormal behavior detector pertaining to the present invention is embodied in one computer set 200. The computer 200 comprises a central processing unit (CPU) 201, a main storage unit 202, an external storage unit 203, an input unit 204, an output unit 205, a video data acquisition unit 206, and a bus 207. The central processing unit 201 controls the entire computer 200. This unit provides functions to the abnormal behavior detector of the present invention in accordance with the programs stored within main storage unit 202 to implement the functions of the position/moving direction calculation means 105 (shown in FIG. 1), the abnormality origin estimation means 106, and other means.

Main storage unit 202 is a storage unit high in data accessing speed, such as a random access memory (RAM), and this unit can temporarily contain the control programs and data intended for central processing unit 201. The programs that implement the functions of means such as position/moving direction calculation means 105 and the abnormality origin estimation means 106, are loaded from external storage unit 203 and saved in main storage unit 202. When necessary, the data required for the execution of these programs can also be loaded from external storage unit 203 and saved in main storage unit 202. Although the data accessing speed of external storage unit 203 is lower than that of main storage unit 202 such as a magnetic disk, external storage unit 203 has a large storage capacity and can permanently hold the control programs and data for central processing unit 201.

Both the programs for implementing the functions of means such as position/moving direction calculation means 105 and the abnormality origin estimation means 106, and the data required for the execution of these programs are saved in external storage unit 203. Input unit 204 consisting of a keyboard, a mouse, and other components, accepts the operations of the detector user. Output unit 205 is either a unit such as cathode-ray tube (CRT) display unit or liquid crystal display unit that displays analytical results as video data, or a unit such as speaker that notifies analytical results to the user by means of sounds such as a warning sound. Output means 107 is implemented by the output unit. Video data acquisition unit 206 is a unit such as video camera that acquires video signals, and video input means 104 is implemented by this unit. Acquired video signals can be digitized and stored as data into main storage unit 202 or external storage unit 203. And all these components of the detector are connected by a bus 207 for exchanging data at high speed.

Next, an example of the internal configuration of the position/moving direction calculation means 105 is shown using the block diagram shown in FIG. 3. The position/moving direction calculation means 105 performs calculations on the position data 301 and moving direction data of moving objects, based on input video data, more specifically, the freeze-frame video data that has been acquired at a specific time by video input means 104, and saves calculation results.

First, moving object extraction portion 303 extracts, from input video data 300, only the moving objects to be monitored. For this reason, background video data 304 consisting only of the stationary objects existing in the monitoring zone is created beforehand and then the differential video data between the background video data and input video data 300 is taken to extract the intended moving objects.

Next, at the position calculation portion 306 herein described later, typical point extraction portion 305 determines, for each moving object, the typical points to be converted into the corresponding coordinate positions of a real space. In general, the moving objects that have been extracted from input video data 300 become a set of closed zones each having an area. For example, the center of gravity of one closed area can therefore be considered as a typical point during calculation. Position calculation portion 306 converts the video coordinates of the moving objects which have been extracted by typical point calculation portion 305, into the corresponding internal coordinates of a real space. At this time, when it can be assumed that the movements of these moving objects are constrained by a plane such as the ground surface, calibration data 307 can be used for conversion from video coordinates into the corresponding internal coordinates of a real space. Calibration data 307 is a matrix for linking a specific point on the plane of a real space to a point on input video data 300. The coordinates in a real space that are calculated by the position calculation portion 306 becomes the output of the position/moving direction calculation means 105 as position data 301.

Model matching portion 308, on the other hand, determines the moving directions of moving objects. The method, called "model matching", that is set forth on pages 142-147 of "Three-Dimensional Image Measurement" (published by Shokodo Co., Ltd.) can be used to determine the directions of movement. This method estimates the way in which, when it is assumed that shape data 309 on a moving object is known, the shape data 309 is to be arranged to create video data similar to the video data of that moving object in the input video data 300 which has become an input. This method requires that the three-dimensional shape data 309 of the moving object should have already been known. Moving direction data 302 is determined from the altitude of a moving object that is calculated from the model matching portion, and the results become the output of the position/moving direction calculation means 105.

Next, an example of the internal configuration of the abnormality origin estimation means 106 is shown using the block diagram shown in FIG. 4. Abnormality origin estimation means 106 judges whether abnormality is occurring in the monitoring zone 100, by use of the information on moving objects that has been calculated by position/moving direction calculation means 105, that is to say, position data 301 and moving direction data 302, and when it is judged that abnormality is occurring, saves this place in the storage location for data 404 which relates to the place where the abnormality is occurring.

First, behavior simulation portion 405 performs behavior simulations and derives from position data 301 the directions in which the moving objects are to be moved. Behavior simulation is one of methods in which the autonomous behavior of a human being and other moving objects is simulated using a computer. In this case, it is assumed that the behavior of moving objects is governed by data called the behavior model 401 consisting of a decision-making algorithm and control parameters. The use of the behavior model 401 enables the moving directions of moving objects to be derived from position data 301. The control parameters in this case constitute the data for controlling the behavior of the moving objects, and it can be considered that the control data represents features and characteristics of the behavior. Therefore, these control parameters are hereinafter called the characteristic quantities. A more specific example of the behavior model 401 is described later in this document.

Next, characteristic quantity calculation portion 400 compares the moving direction data that has been obtained by observation, and the moving direction that has been determined by behavior simulation portion 405, then estimates the control parameters of the behavior simulation portion 405, namely, the characteristic quantities, so as to minimize the difference between the moving direction data and the determined moving direction, and saves the results as characteristic quantity data 402.

Finally, abnormality judgment portion 403 analyzes the characteristic quantity data 402 that has been obtained by characteristic quantity calculation portion 400, and then judges which moving object is causing the abnormality of other objects. In the case that the moving object is causing the abnormality of other objects, the three-dimensional positions of these moving objects in a real space are saved as data 404 which relates to the place where the abnormality is occurring.

Figure 17:
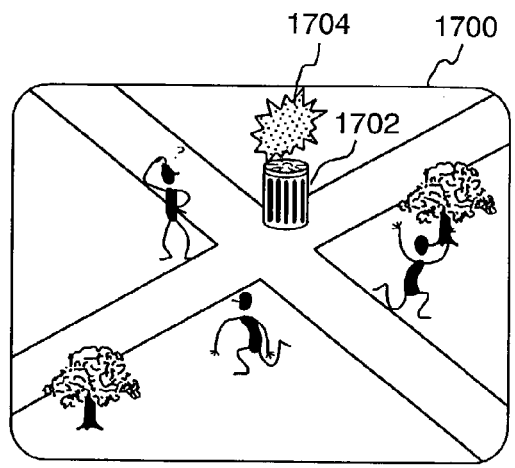
FIG. 17 is a diagram showing an example of synthetic output of actual video data and the place of occurrence of abnormality.

Next, an example of display by the output means 107 shown in FIG. 1 is described using FIG. 17. This example in FIG. 17 applies to synthetic display of actual video data and the place where abnormality is occurring. On display 1700, graphics 1704 showing the place where the abnormality is occurring is displayed in overlapped form on the actual video data that has been acquired by video input means 104. In this example, since it is assumed that a garbage box 1702 is the place where the abnormality is occurring, graphics 1704 is displayed near the garbage box. By adopting this display method, it is possible for the monitoring person to immediately judge to which object in the actual video data the place of occurrence of the abnormality corresponds.

Figure 5A:
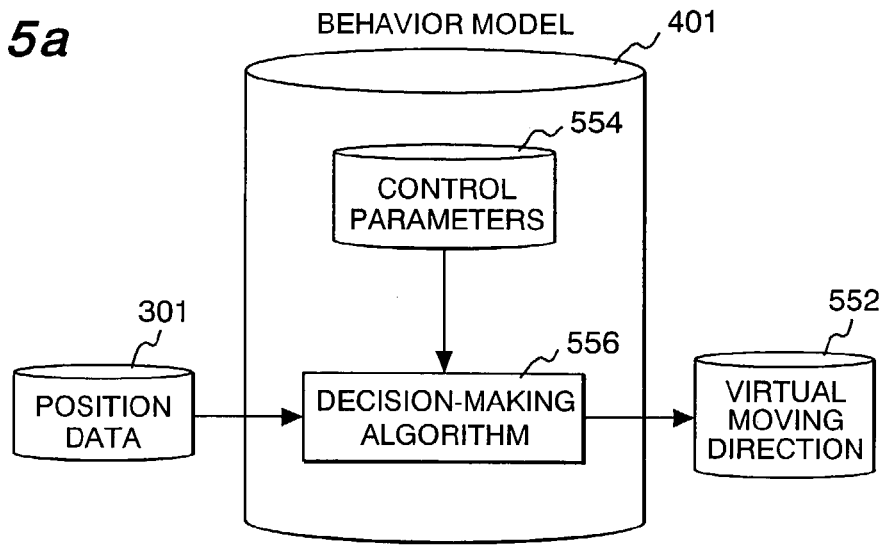
FIG. 5 is a diagram showing an example of the behavior model in the present invention.
Figure 5B:
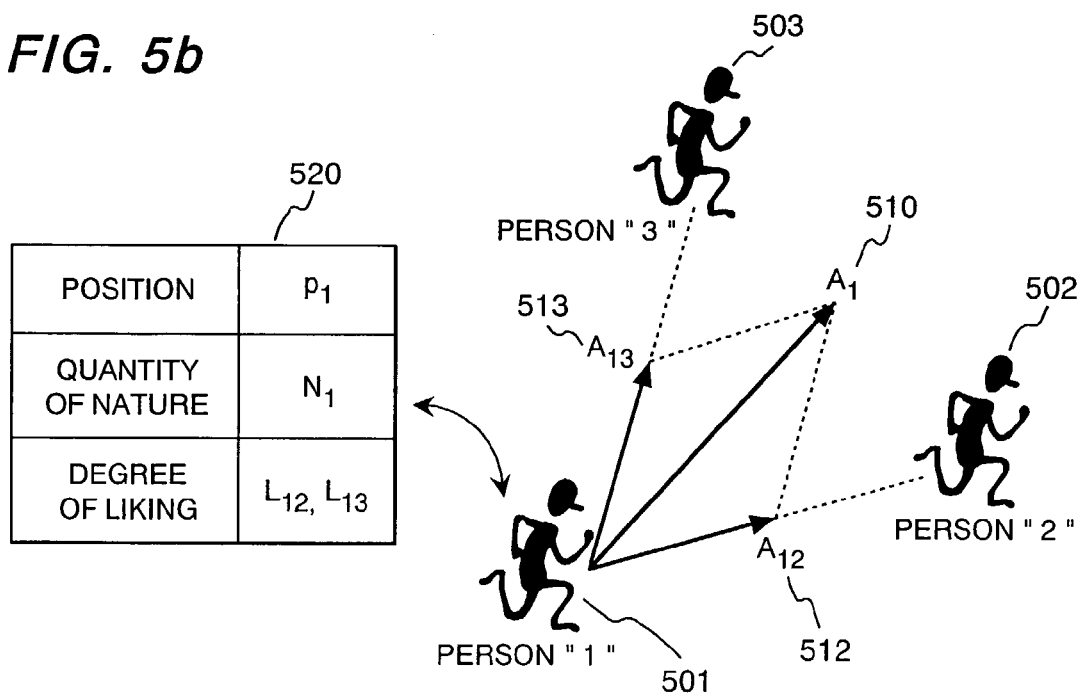

Next, a more specific example of the behavior model 401 is described using FIG. 5.

FIG. 5 (*a*) is a diagram showing the functional configuration of the behavior model 401. The behavior model 401 consists of a decision-making algorithm 556 and its control parameters 554. The decision-making algorithm 556 is a program that determines the behavior of moving objects, and virtual moving directions 552 in which the moving objects are to be moved are calculated from their position data 301 by this program. The control parameters 554 are parameters relating to decision-making algorithm 556, and these parameters can control the calculation results obtained from decision-making algorithm 556. All that is required for the behavior model 401 itself is only to select the appropriate behavior model according to the particular field of application of the present invention.

Next, the model described on pages 212-221 of "Modeling of Mass Behavior—Interaction between a Throng of People and Environment in a Virtual Urban Space" (Journal of Papers, C, published by the Institute of Electrical Engineers of Japan, February/1997 Issue) is described below as an example of a behavior model. This model assumes that humans behave under mental stimuli, and models the effects of the stimuli on behavior. For example, if one person finds another person in the corner of a street, the former may approach, or move away from, the latter, as if physical force were applied. Such behavior is modeled using the virtual force, called the degree of attractiveness, that occurs between human beings, and then the directions in which the human beings will move are determined from the degree of attractiveness. In this way, the behavior of humans is simulated.

Next, a more specific example of behavior simulation with this model is described below using FIG. 5 (*b*). This figure shows the way, in a group consisting of a person 1 (501), a person 2 (502), and a person 3 (503), the person 1 (501) receives mental stimuli from other persons and determines the direction in which the person 1 is to move. Person 1 (501) receives virtual force, more specifically, the degree-of-attractiveness $A_1$ determined by vectorial synthesis between degree-of-attractiveness $A_{12}$ (512) and degree-of-attractiveness $A_{13}$ (513), from other persons, and the person 1 (501) moves in that direction. The degree-of-attractiveness level $A_{12}$ (512) is the attractive force or repulsive force that the person 1 (501) receives from the person 2 (502) because of the mental factor of liking or disliking. Similarly, the degree-of-attractiveness level $A_{12}$ (512) is the attractive force or repulsive force that the person 1 (501) receives from the person 3 (503). This model can be represented as follows using a numerical formula:

$$A_i = \sum_j L_{ij} S_{ij} N_j e_{ij} \qquad \text{(Formula 1)}$$

where "$L_{ij}$" denotes to what extent the person "i" likes the person "j". Changes in the degree of attractiveness according to human relations can be represented by, for example, increasing the degree of attractiveness if both persons have an acquaintance with one another, or decreasing the degree of attractiveness if there is no acquaintance between the two persons. "$S_{ij}$" denotes the sensitivity of the person "i" when he or she observes the person "j". Changes in the degree of attractiveness according to the relationship in physical position between humans can be represented by, for example, increasing the sensitivity of the person "i" if the distance between both persons is long, or decreasing the sensitivity of the person "i" if the distance between both persons is short. "$N_j$" is a value denoting the quantity of nature of the person "j", and this value represents the individuality of the observed person that corresponds to the degree of liking of the observing person. For example, when one person observes a plurality of other persons, even if the degree of liking of the observing person against all persons is the same, the degree of attractiveness differs according to the particular individualities of the observed persons. And "$e_{ij}$" is a unidirectional vector directed from person "i" to person "j", and this vector dictates the direction in which the degree of attractiveness occurs. Among the parameters that control the behavior of these persons, that is to say, the control parameters, is included a scalar quantity, which is represented as the quantity of nature, "$N_j$", and corresponds to the magnitude of the effects of person "j" on other persons. Therefore, "$N_j$" characterizes the corresponding behavior and in this case, "$N_j$" is considered to be a characteristic quantity. As this characteristic quantity increases, the behavior of other persons will be affected more significantly. Conversely, as the characteristic quantity decreases, the effects on the behavior of other persons will also decrease. In this case, in order to emphasize that the degree of attractiveness, "$A_i$", is a function of the characteristic quantity "$N(N_1, \ldots, N_n)$", this relationship is represented as follows using the following formula:

$$A_i(N) = \sum_j L_{ij} S_{ij} N_j e_{ij} \qquad \text{(Formula 2)}$$

Next, the data structure for mounting this model by use of a computer is described below. In this description, only a table 520 relating to the person 1 (501) is set forth for the sake of simplicity. A similar table can also be provided for other persons. The degree of attractiveness can be determined by conducting calculations using formula 2 above, that is to say, the data of the tables thus provided for each person. Table 520 contains the data consisting of the position "$p_1$", nature "$N_1$", and the levels of liking, "$L_{12}$" and "$L_{13}$", of the person.

A function concerning the distance between persons can be used to determine sensitivities "$S_{12}$" and "$S_{13}$", which are not contained in the table. For example, such a function decreasing inversely with the distance as represented by the formula shown below can be used. It is possible, by using this formula, to represent the way the sensitivity will increase as the distance between persons decreases, or conversely, the sensitivity will increase as the distance between persons increases.

$$S_{ij} = 1/|p_j - p_i| \qquad \text{(Formula 3)}$$

When this model is adopted, formula 2 corresponds to the decision-making algorithm shown in FIG. 5 (*a*), and the characteristic quantity "$N(N_1, \ldots, N_n)$" corresponds to the control parameters 554.

Figure 24:
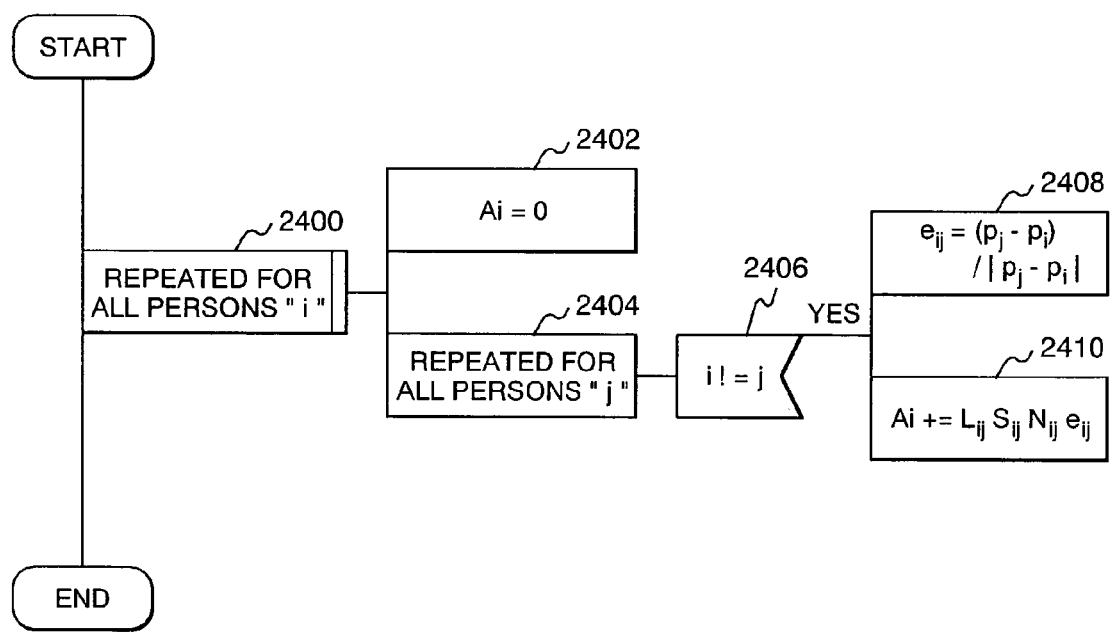
FIG. 24 is a flowchart explaining the processing flow for determining the moving direction from the degree of attractiveness.

Next, the flow of calculating the degree of attractiveness is described below using FIG. 24. This figure shows an example in which the degree of attractiveness, "$A_i$", with respect to all persons "i" is calculated. Step 2400 denotes calculating the degree of attractiveness, "$A_i$", with respect to all persons "i", by repeating the processes of steps 2402 to 2410. In step 2402, the degree of attractiveness, "$A_i$", that is to be calculated with respect to a person "i" is cleared to zero. In step 2404, the degree of attractiveness, "$A_i$", that the person "i" receives from a person "j" is calculated by repeating steps 2406 to 2410, and then the final degree of attractiveness is calculated by synthesizing the results. In step 2406, whether the person "i" and the person "j" are identical persons is checked and only when both are different persons, will the processes of steps 2408 to 2410 be performed. These processes need to be performed because the above step assumes that no one receives the degree of attractiveness from herself or himself. In step 2408, in order to determine the direction of the degree of attractiveness that the person "i" receives from the person "j", the unidirectional vector "$e_{ij}$" from the position "$p_i$" of the person "i" to the position "$p_j$" of the person "j" is calculated. In step 2410, the degree of attractiveness that the person "i" receives from the person "j" is calculated and the results are added to the degree of attractiveness, "$A_i$". The degree of attractiveness with respect to all persons can be calculated by processing described above.

Figure 6:
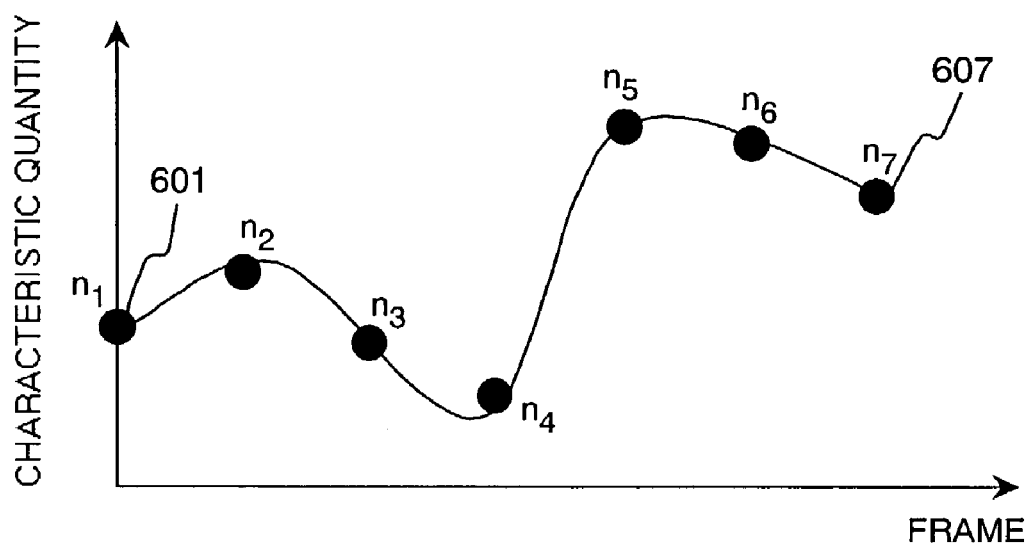
FIG. 6 is a diagram showing examples of characteristic quantity data.

Next, details of the characteristic quantity data 402 are described below using FIG. 6. FIG. 6 shows an example of the characteristic quantity data 402 with respect to a specific moving object. Characteristic quantity data 402 is, as described earlier, is a scalar quantity that characterizes behavior, in particular, among all parameters relating to the behavior model, and this quantity is calculated by the characteristic quantity calculation portion 400. Since the characteristic quantity calculation portion 400 calculates the characteristic quantity data 402 for each chronological video frame received from the video input means 104, the characteristic quantity data 402 also becomes chronological data. FIG. 6 indicates that the characteristic quantity data of a person changes from "$n_1$" (601) to "$n_7$" (607) according to the particular frame.

Figure 7:
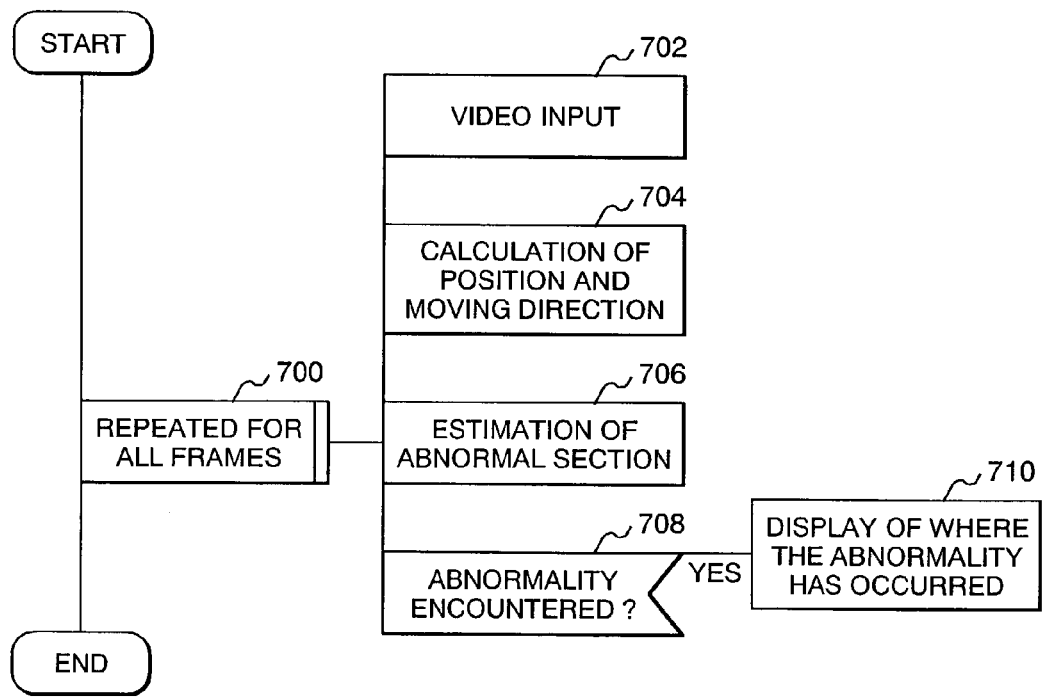
FIG. 7 is a flowchart showing the total processing flow in the abnormal behavior detector pertaining to the present invention.

FIG. 7 is a flowchart explaining the total processing flow in the abnormal behavior detector pertaining to the present invention. In step 700, the processes of steps 702 to 708 are repeated for all frames of input video data. In step 702, video data of monitoring zone 100 is acquired by use of video input means 105. In step 704, the positions and moving directions of the moving objects existing in the acquired video data are calculated by position/moving direction calculation means 105. In step 706, abnormality origin estimation means 106 uses obtained position/moving direction information to judge whether abnormality is occurring, and if abnormality is actually happening, estimates that place. In step 708, whether abnormality is occurring is judged from the output results of step 706 that have been sent from output means 107. If abnormality is occurring, information on the abnormality and on the place of its occurrence will be displayed to alert it to the user of the abnormal behavior detector pertaining to the present invention.

Figure 8:
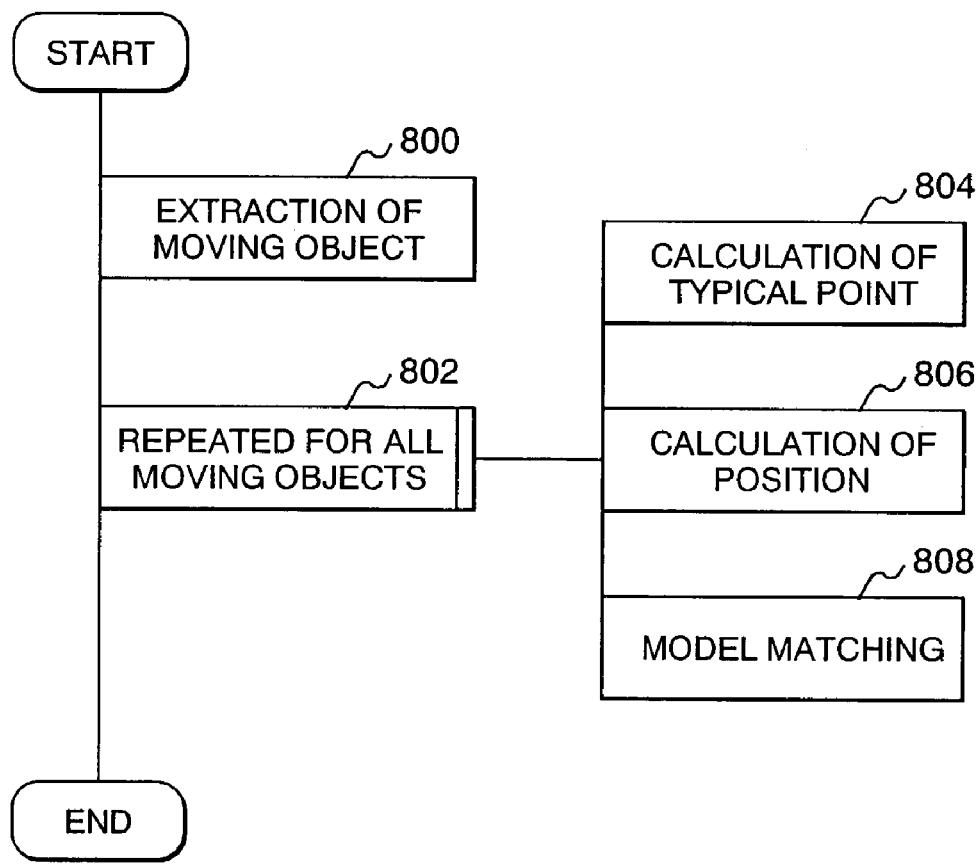
FIG. 8 is a flowchart showing the flow of position/moving direction calculation.

FIG. 8 is a flowchart explaining the flow of internal processing by the position/moving direction calculation means 105, shown in FIG. 3. In step 800, the moving objects to be monitored are extracted from input video data 300 by use of the moving object extraction portion 303. In step 802, the processes of steps 804 to 808 are repeated for all the moving objects that were extracted in step 800. In step 804, the typical points of the extracted moving objects are determined for each moving object by the typical point calculation portion 305 shown in FIG. 1. In step 806, the video coordinates of those typical points of moving objects that were determined in step 804 are converted into the internal coordinates of a real space and the results are saved as position data 301. In step 808, the direction of movement is determined by model matching portion 308 with respect to all the moving objects that were extracted in step 800, and the results are saved as moving direction data 302.

Figure 9:
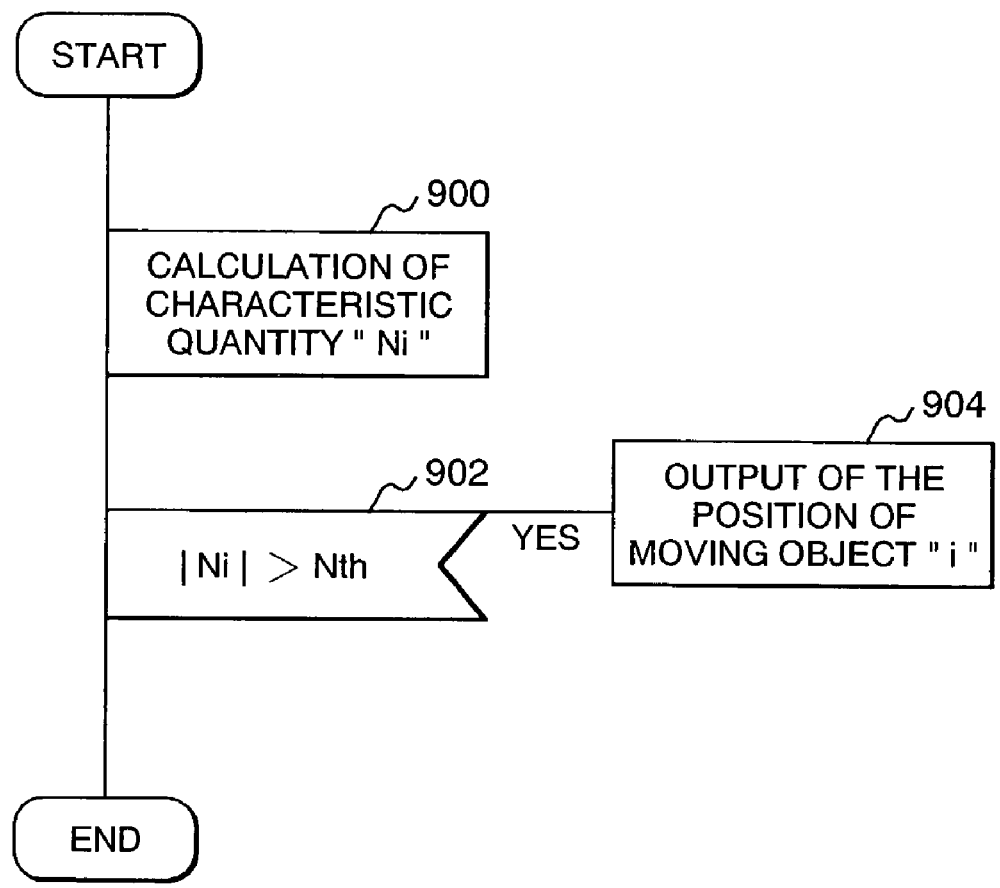
FIG. 9 is a flowchart showing the flow of abnormality origin estimation.

FIG. 9 is a flowchart explaining the flow of internal processing by the abnormality origin estimation means 106, shown in FIG. 4. In step 900, the characteristic quantities "$N_i$" with respect to moving object "i" ("i=1, n|n" denotes the number of moving objects) are calculated from position data 301 and moving direction data 302 by use of the behavior simulation portion 405 and the characteristic quantity calculation portion 400, and the results are saved as characteristic quantity data 402. Details of the method of calculating the characteristic quantities "$N_i$" are described later. Steps 902 to 904 are performed by the abnormality judgment portion 403 to judge whether abnormality is occurring. In step 902, it is examined whether the characteristic quantities "$N_i$" that were obtained in step 900 include an absolute value greater than a predetermined threshold value "Nth". When the behavior model using the degree of attractiveness described earlier in this document is adopted, characteristic quantities "$N_i$" represent to what extent the moving object "i" affects other moving objects. If any absolute values of the characteristic quantities are greater than a certain value, therefore, other moving objects are being significantly affected and it is thus assumed that this is causing the abnormal behavior of other moving objects. The number of moving objects judged in step 902 to be causing abnormal behavior can be either one or more than one.

If, in step 902, moving object "$N_i$" is judged to be causing the abnormal behavior of other moving objects, the position of the moving object "$N_i$" will be saved as abnormality origin data 404.

Figure 10:
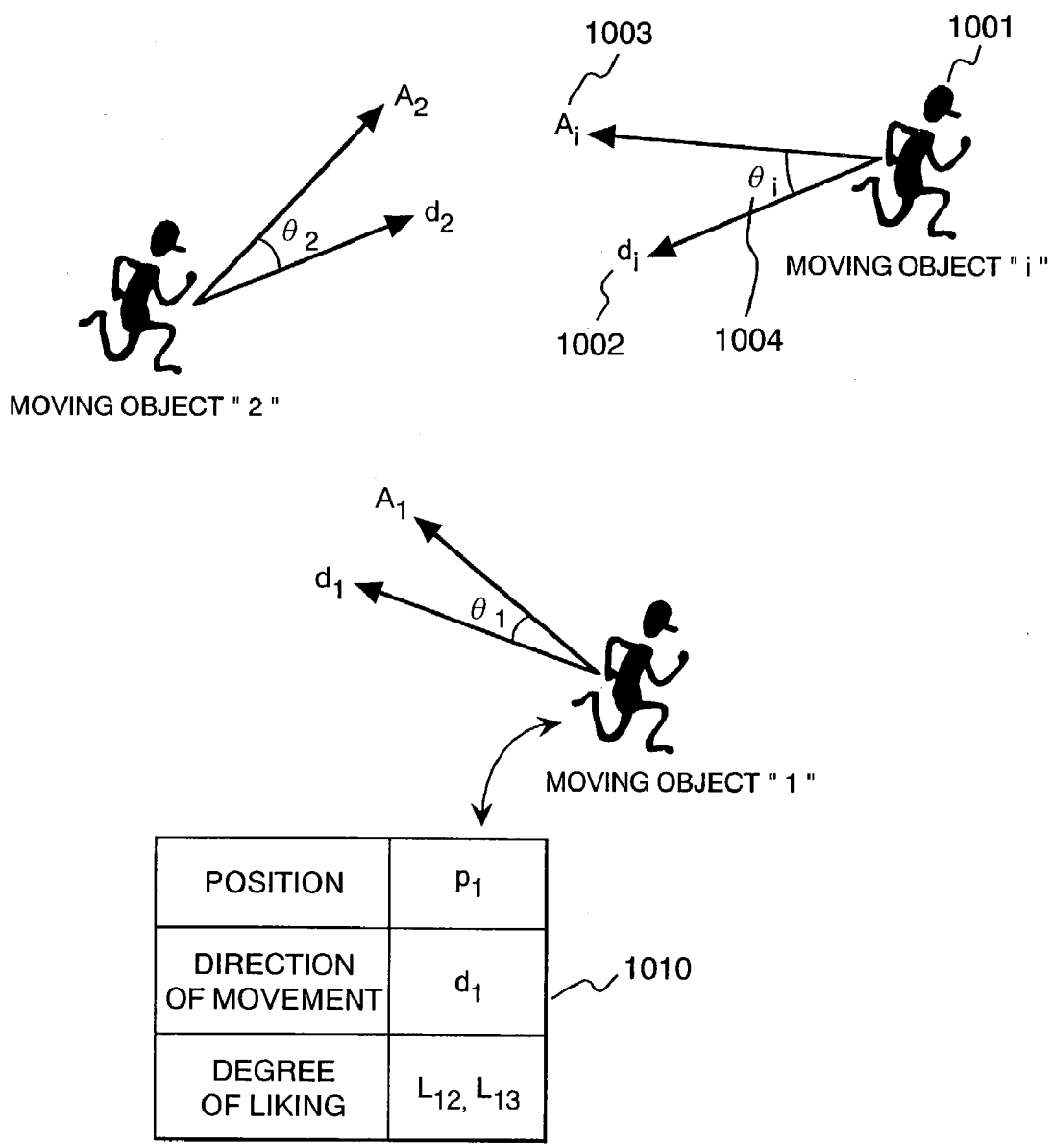
FIG. 10 is a diagram explaining the estimation of characteristic quantities.

Next, an example of a method of calculating characteristic quantities by use of the characteristic quantity calculation portion 400 is described below using FIG. 10. Basically, the parameters for behavior simulation are estimated so that the observed actual moving direction and the moving direction which has been obtained by simulation agree as far as possible. In other words, characteristic quantity data 402 is estimated so as to minimize the difference between moving direction data 302, which is the observed data denoting the moving direction of the moving object, and a virtual moving direction, which is determined from behavior model 401 by the behavior simulation portion 405. Here, the case is considered that this problem is to be solved as a nonlinear programming problem. That is to say, when the angle difference between the actual moving direction "$d_i$" (1002) represented by the moving direction data 302 with respect to moving object "i" (1001), and the virtual moving direction "$A_i$" (1003) determined by the behavior simulation portion 405, is taken as "$\theta_i$" (1004), the following formula is to be considered:

$$f(N) = \sum_i (1 - \cos\theta_i) = \sum_i (1 - d_i/|d_i| \cdot A_i(N)/|A_i(N)|) \quad \text{(Formula 4)}$$

As the angle difference between "$d_i$" (1002) and "$A_i$" (1003) decreases, the value of formula 4 above will become smaller, and if there is no angle difference, in particular, the value of this formula will become a minimum value of 0. These tendencies mean that calculating the characteristic quantity "$N_i$" that minimizes the value of formula 4 is the same as calculating the characteristic quantity "$N_i$" that minimizes the angle difference between "$d_i$" (1002) and "$A_i$" (1003). Here, therefore, the characteristic quantity "$N_i$" that minimizes the value of formula 4 is to be calculated. Also, "f(N)" is called the objective function. Next, the data structure for mounting this model by use of a computer is described below. In this description, only a table 1010 relating to moving object 1 is set forth for the sake of simplicity. A similar table can also be provided for other persons. The characteristic quantity "$N_i$" that minimizes the value of formula 4 can be calculated using the data of the tables thus provided for each person. Table 1010 contains the data consisting of the position "$p_1$", moving direction "$d_i$", and the levels of liking, "$L_{12}$" and "$L_{13}$", of the moving object. A function concerning the distance between persons can be used to determine the sensitivities "$S_{12}$" and "$S_{13}$" required for the calculation of the degree of attractiveness. For example, the function in formula 3 can be used.

Figure 11:
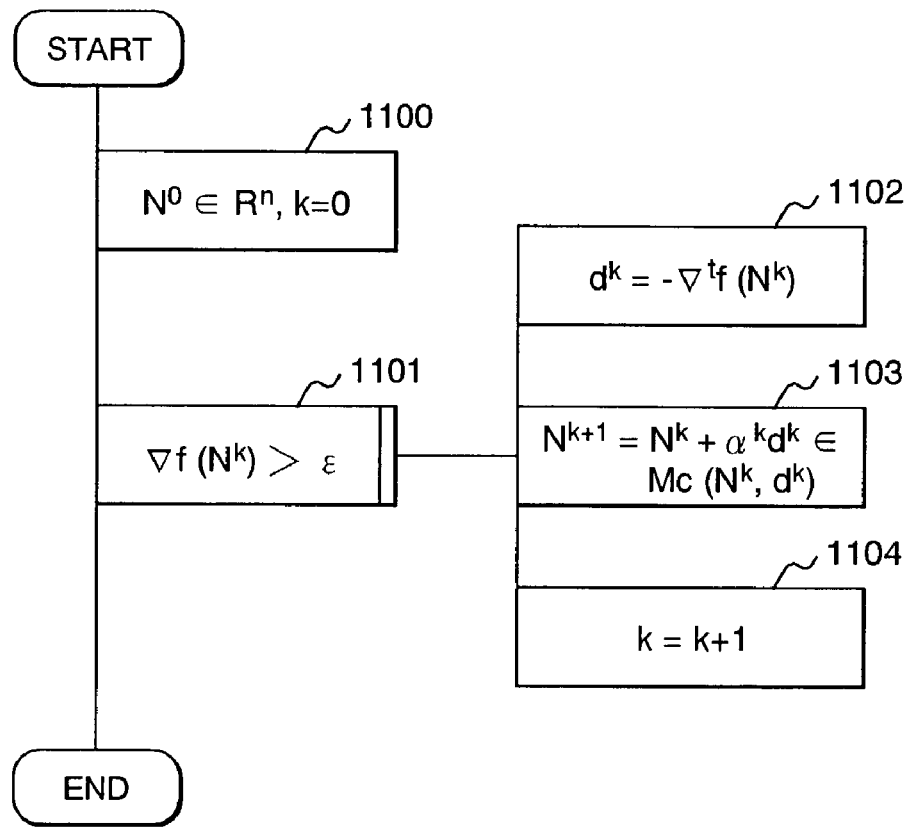
FIG. 11 is a diagram showing the flow of processing with the Steepest Descent Method.

The characteristic quantity "$N_i$" that minimizes the value of formula 4 can be calculated by using generally known solutions to nonlinear programming problems. It is possible to use, for example, the Steepest Descent Method described on pages 140-146 of "Nonlinear Programming Method" (published by the Japan Union of Scientists and Engineers, Press). The Steepest Descent Method is described below using the flowchart of FIG. 11. This figure shows the procedure for obtaining the solution N that minimizes the objective function "f(N)". In step 1100, the initial value "$N^0$" of the solution is randomly selected from a solution space "$R^m$" and at the same time, "k", the number of times the required computation is to be repeated, is cleared to 0.

In step 1101, processing in steps 1102 to 1104 is repeated while the value of "$\nabla f(N^k)$" stays greater than a very small value of "$\epsilon$", and when a sufficient solution is obtained, this indicates that the computation has been completed. In step 1102, the direction vector "$d^k$" to be used to search for the solution is calculated. The "$\nabla$" symbol in "$\nabla f(N^k)$" signifies nabla and is an arithmetic symbol used to calculate the gradient of a certain function. In step 1103, the solution is updated using the direction vector "$d^k$" that was calculated in step 1101. Here, "$Mc(N^k, d^k)$" indicates that "$\alpha^k$" is determined in accordance with the rule of Curry.

The rule of Curry relates to one of the methods of determining the "$\alpha^k$" parameter for increasing solution-searching efficiency. In step 1104, "k", the number of times the required computation is to be repeated, is increased by 1. The solution N for minimizing the objective function "f(N)" can be obtained by repeating processing described above.

Figure 23:
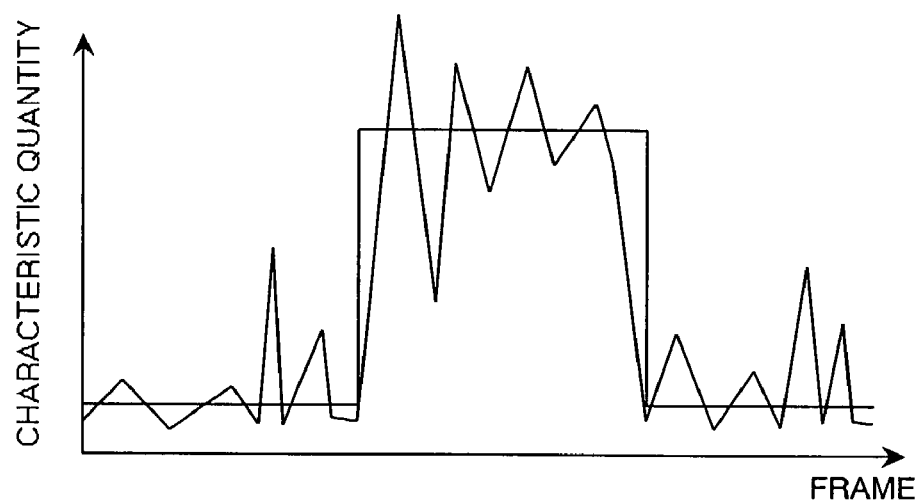
FIG. 23 is a diagram explaining the smoothing of characteristic quantity data.

Next, the smoothing of calculated characteristic quantities is described below using FIG. 23. As shown in graph 2300, noise components due to measurement errors and other various errors may be included in the characteristic quantities calculated using the above-described calculation method. The presence of these noise components may, in turn, result in the fact that the behavior which originally should be judged abnormal is mis-judged to be normal. When the noise cannot be ignored for this reason, the noise can be removed by smoothing characteristic quantity data, as shown in graph 2303. Such smoothing can be achieved by, for example, taking an average from the past number of frames of characteristic quantity data and the current number of frames of characteristic quantity data.

Figure 22A:
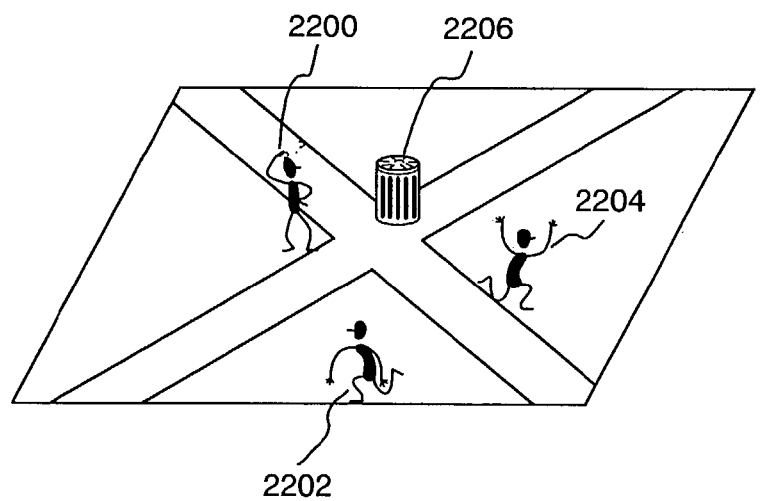
FIG. 22 is a diagram explaining the extension of the scope of application of moving objects.
Figure 22B:
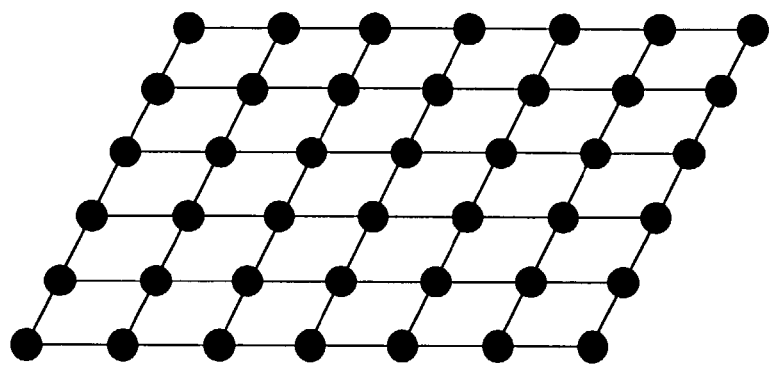

Next, a method in which the above-described characteristic quantity calculation method is also to be applied to objects other than moving objects is described below using FIG. 22. The above-described characteristic quantity calculation method is intended only for moving objects. Therefore, this method cannot be applied if the presence of the garbage box 2206 shown as a stationary object in FIG. 22 (b) causes the abnormal behavior of a moving object 2200, 2204, or 2204. In this case, however, it becomes possible to apply the above-described characteristic quantity calculation method by extracting manually and beforehand the objects that may cause abnormality, and then regarding these objects as stationary special moving objects. By doing so, it also becomes possible to extract the characteristic quantities of stationary objects. When objects likely to cause abnormality cannot be assumed, it is preferable that the objects monitored should be divided into zones first and then stationary special moving objects should be virtually arranged in each such zone so as to enable processing. For example, as shown in FIG. 22 (b), the objects monitored should be divided into mesh form and then stationary moving objects should be arranged on the grid points of the meshwork.

By adopting he embodiment set forth above, behavioral features and characteristics of moving objects can be analyzed using only the momentary position and moving direction information of the moving objects, then the place where the abnormal behavior of abnormal objects has been caused can be estimated automatically, and thus the results can be presented to the user of the present detector. Accordingly, the cause of the abnormal behavior of moving objects can be immediately identified from video information that has been obtained during observation.

Figure 18:
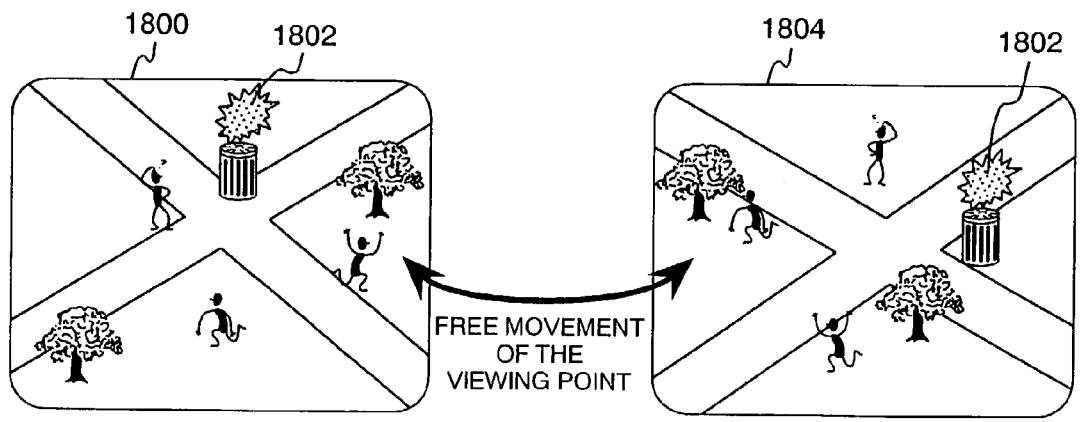
FIG. 18 is a diagram showing an example of synthetic output of three-dimensional CG video data and the place of occurrence of abnormality.
Figure 19A:
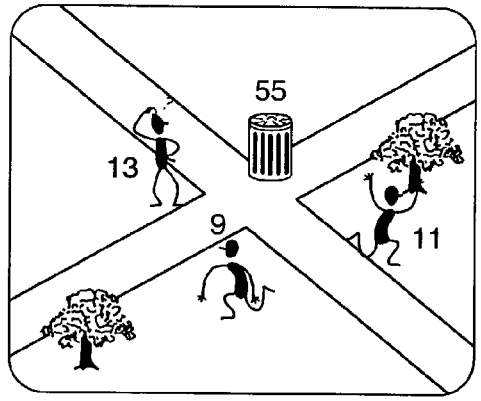
FIG. 19 is a diagram showing examples of displaying characteristic quantities.
Figure 19B:
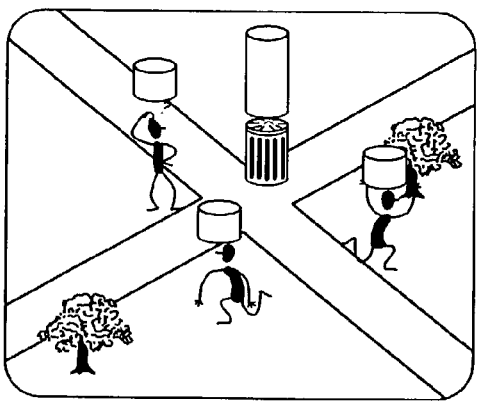
Figure 19C:
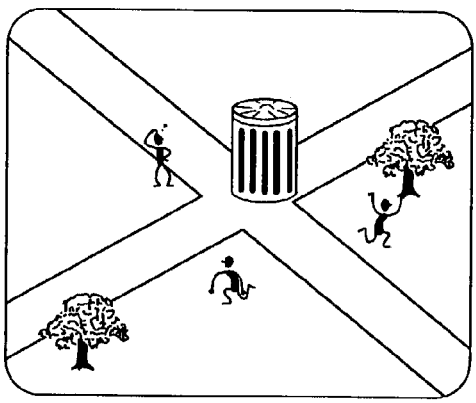
Figure 19D:
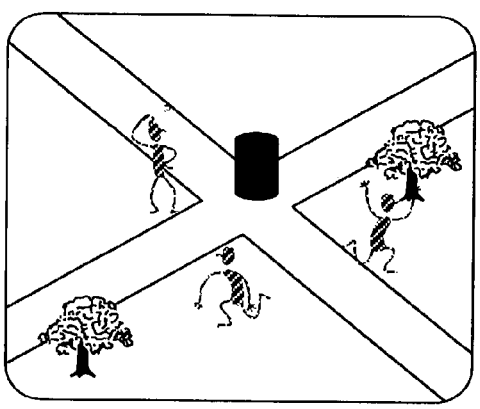
Figure 19E:
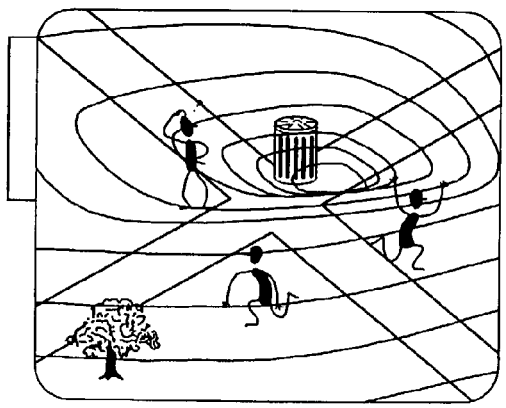

Under the embodiment described above, actual video data and the graphics representing the place of occurrence of the abnormality are synthesized and the results are obtained as the output of output means 107. However, three-dimensional computer graphics (CG) and the graphics 1802 representing the place of occurrence of the abnormality can also be displayed in synthesized form as shown in FIG. 18. The use of three-dimensional CG display enables the viewing point to be freely changed as in the case of display 1800 or 1804. In this case, however, there is a need to provide the three-dimensional shape data of all objects present in the monitoring zone beforehand to prepare for three-dimensional CG display.

Under such configuration, even if, in actual video data, the place of occurrence of the abnormality is intercepted by the presence of other objects and cannot be viewed, the place of occurrence of the abnormality can be confirmed by changing the viewing point in three-dimensional CG display and switching the display.

Although the characteristic quantity data 402 itself in the above embodiment is not displayed at output means 107, the data can also be incorporated into display as shown in FIG. 19. FIG. 19 (*a*) shows an example in which the characteristic quantity data 402 is displayed digitally in synthesized form for each moving object. FIG. 19 (*b*) shows an example in which the characteristic quantity data 402 is displayed graphically in synthesized form for each moving object. The height of a cylinder is linked so as to vary in proportion to characteristic quantity data 402. FIG. 19 (*c*) shows an example in which the display size of moving objects is changed according to the particular magnitude of the characteristic quantity data 402. Objects larger in the magnitude of the data are displayed in a larger size, and objects smaller in the magnitude of the data are displayed in a smaller size. FIG. 19 (*d*) shows an example in which the display color of moving objects is changed according to the particular magnitude of the characteristic quantity data 402. Objects larger in the magnitude of the data are displayed in a brighter color, and objects smaller in the magnitude of the data are displayed in a darker color. The transparency levels of moving objects can also be modified according to the particular magnitude of the characteristic quantity data 402.

For example, objects larger in the magnitude of the data are reduced in transparency level, and objects smaller in the magnitude of the data are increased in transparency level. FIG. 19 (*e*) shows an example in which, in order to enable hums to observe easily the occurrence situation of the degree of attractiveness, this situation is displayed by estimating the potential field with respect to the degree of attractiveness that occurs to each person. The degree of attractiveness can be obtained by applying to formula 2 the characteristic quantities "N" that have been calculated using the above procedure. In order to estimate the potential field, it is assumed here that as with the relationship between gravitational acceleration and potential energy, the relationship between a vector field and the potential field corresponding thereto is established for the degree of attractiveness as well. In general, the potential field can be calculated from a given vector field by regarding the vectors distributed over the vector field, as the gradient of the potential field, and integrating the vector field. The displays in FIGS. 19 (*a*), (*b*), and (*e*) can be applied to both synthetic display between actual video data and the place of occurrence of abnormality, and synthetic display between CG video data and the place of occurrence of abnormality. The displays in FIGS. 19 (*c*) and (*d*) can be applied only to the CG video/abnormality origin synthetic display shown in FIG. 18, wherein moving objects are displayed in a CG format.

Under this mode of display, since moving objects and the characteristic quantities of their behavior can be linked and visualized, the user of the system pertaining to the present invention can easily confirm the behavior of moving objects.

Figure 20:
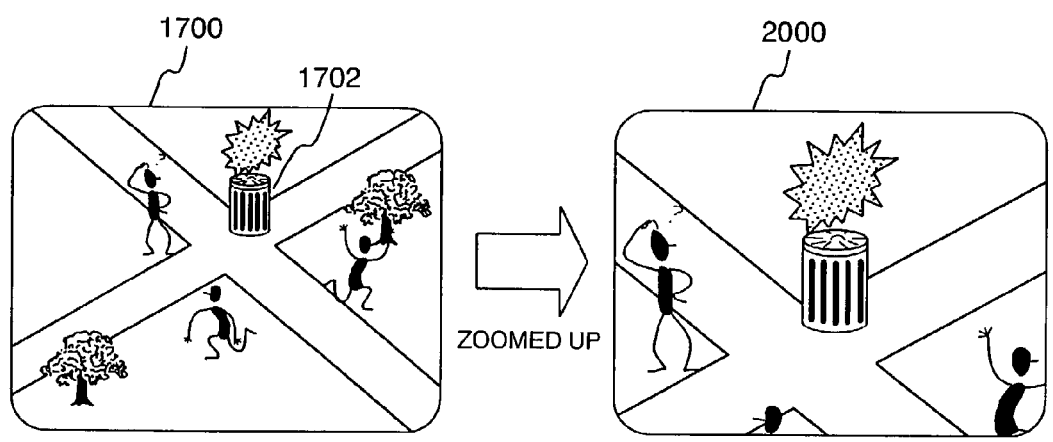
FIG. 20 is a diagram explaining zoomed-up display of the place of occurrence of abnormality.

In the above-described embodiment of the present invention, when the place of occurrence of abnormality is estimated, actual video data or three-dimensional CG video data and video data of the corresponding place are only synthesized for display. Instead, however, it is also possible for the place of occurrence of abnormality to be displayed as display 1700 first and then to be displayed in zoomed-up form as display 2000, as shown in FIG. 20. This figure assumes that garbage box 1702 is the place where the abnormality is occurring. Video data that has been acquired using video input means 104 can be zoomed up or moved by image processing to implement zoomed-up display. When the video camera for implementing video input means 104 can be controlled with a computer, zoomed-up display can also be achieved by panning, tilting, and/or zooming up this camera.

Under this mode of display, since the place of occurrence of abnormality can be zoomed up for improved visibility, the user of the system pertaining to the present invention can easily confirm the abnormal status.

Figure 21:
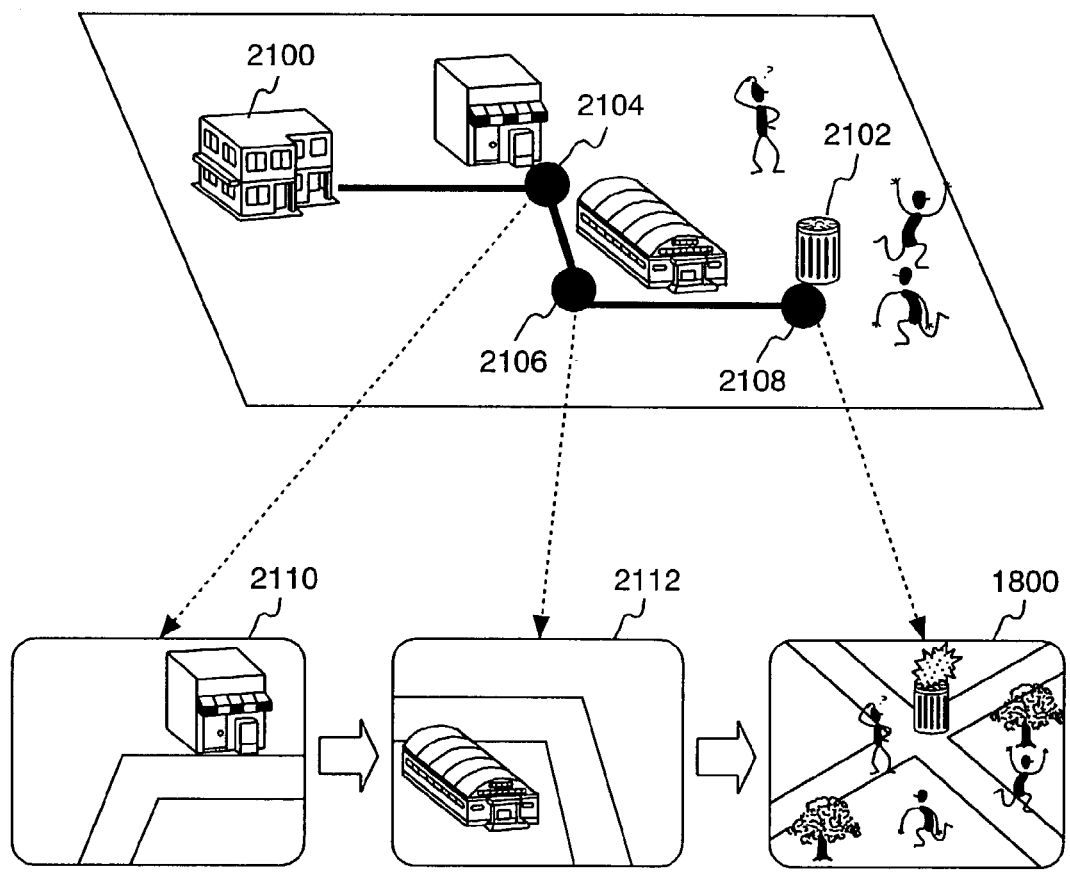
FIG. 21 is a diagram explaining guidance display for switching from the monitoring place to the place of occurrence of abnormality.

Although the above-described embodiment of the present invention is intended to display only objects present in the monitoring zone, objects present in other zones can also be displayed. An example of guidance display for switching from the monitoring place to the place where the abnormality is occurring is shown in FIG. 21. In this example, all the actual video data or three-dimensional CG video data corresponding to the distance from the monitoring place 2100, in which the user of the system pertaining to the present invention (namely, the monitoring person) is monitoring, to abnormality origin 2102, is displayed in order. The points within that distance and the respective displays correspond. For example, point 2104, point 2106, and point 2108 correspond to display 2110, display 2112, and display 1800, respectively.

By adopting this mode of display, it is possible for various video data of the distance-corresponding zone to the place of occurrence of abnormality to be presented to the monitoring person in sequence. Thus, it is expected that the monitoring person will be able to immediately reach the place where the abnormality is occurring.

Figure 12:
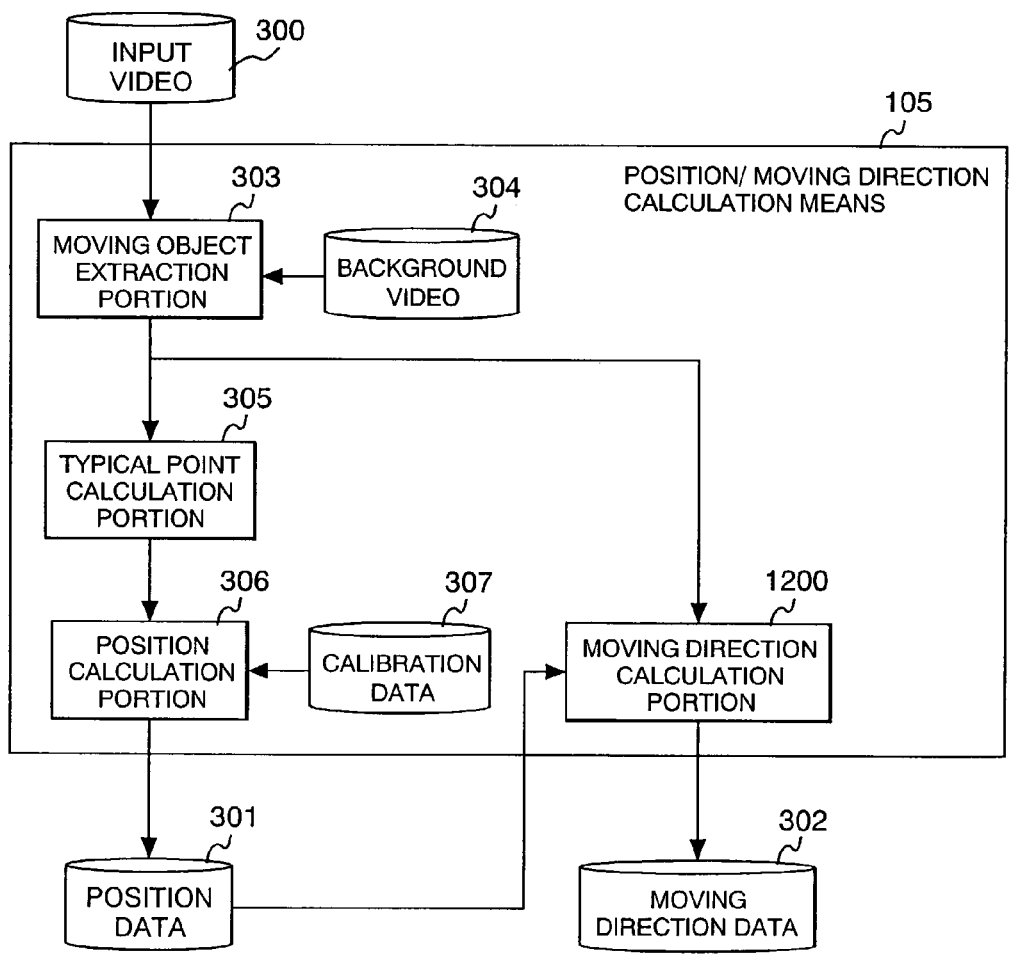
FIG. 12 is a block diagram showing the internal configuration of the position/moving direction calculation means in the case of deriving the moving direction of the path.

Although, in the above-described embodiment of the present invention, model matching in the internal configuration of the position/moving direction calculation means 105 is used to calculate the moving directions of moving objects, the moving directions of these objects can also be determined from the respective paths instead, as shown in FIG. 12. In this case, the moving direction calculation portion 1200 shown in FIG. 12 needs to be provided instead of the model matching portion 308 and shape data 309 inside the position/moving direction calculation means 105 shown in FIG. 3. Position data 301 also needs to be able to hold past position information for each moving object. Hereinafter, the chronological position information of moving objects that is obtained from the above position data and calculated moving direction data is called the path. Position/moving direction calculation means 105 determines the moving direction of each moving object from its path and saves the results as moving direction data 302. Other functions are the same as those described in FIG. 3.

Figure 13:
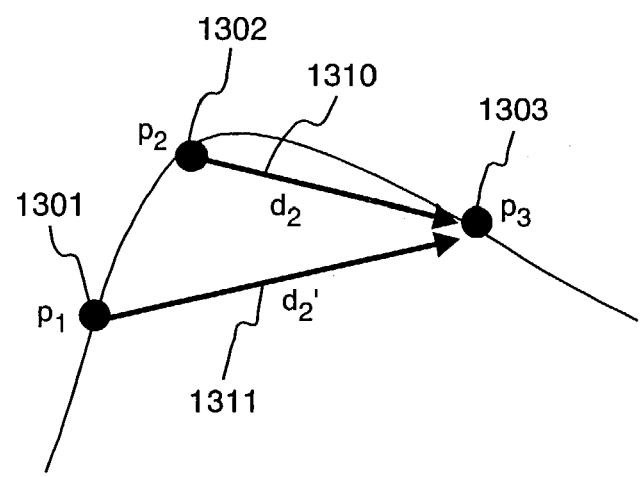
FIG. 13 is a diagram explaining an example of calculating the moving direction of the path.

Next, an example in which the position/moving direction calculation means 105 determines a moving direction from an observed path is described below using FIG. 13. The set of chronological information consisting of "$p_1$" (position 1201), "$p_2$" (position 1202), and "$p_3$" (position 1203), denotes the path of a specific moving object. The example shown in FIG. 13 applies to the case that the moving direction at "$p_2$" (position 1202) can be determined by calculating the direction vector "$d_2$" (1210) directed from "$p_2$" (position 1202) to "$p_3$" (position 1203). Instead, the moving direction at "$p_2$" (position 1202) can be determined by calculating the direction vector "$d_2$" (1211) directed from "$p_1$" (position 1201) to "$p_3$" (position 1203).

It is possible, by adopting the embodiments set forth above, to calculate moving directions from not more than several frames of position information relating to moving objects, without providing the three-dimensional shape data of monitoring targets beforehand as with model matching.

The above-described embodiments use a single behavior model in the internal configuration of the abnormality origin estimation means 106 shown in FIG. 4. Instead, however, a model suitable for the moving objects which are to undergo processing can be selected, as appropriate, from more than one behavior model provided beforehand. For example, if the monitoring targets are an exhibition site, a station yard, and the lobby of a hotel, the behavior model to be used to monitor persons and/or moving objects is likely to vary from target to target. For example, in the case of an exhibition site, people would behave primarily to watch the exhibits interesting them, and in the case of a station yard, they would change trains for the destination. In these cases, better characteristic quantities can be obtained by providing the appropriate behavior model for each type of object to be monitored, then changing the behavior model as appropriate, and calculating behavioral characteristic quantities.

Figure 14:
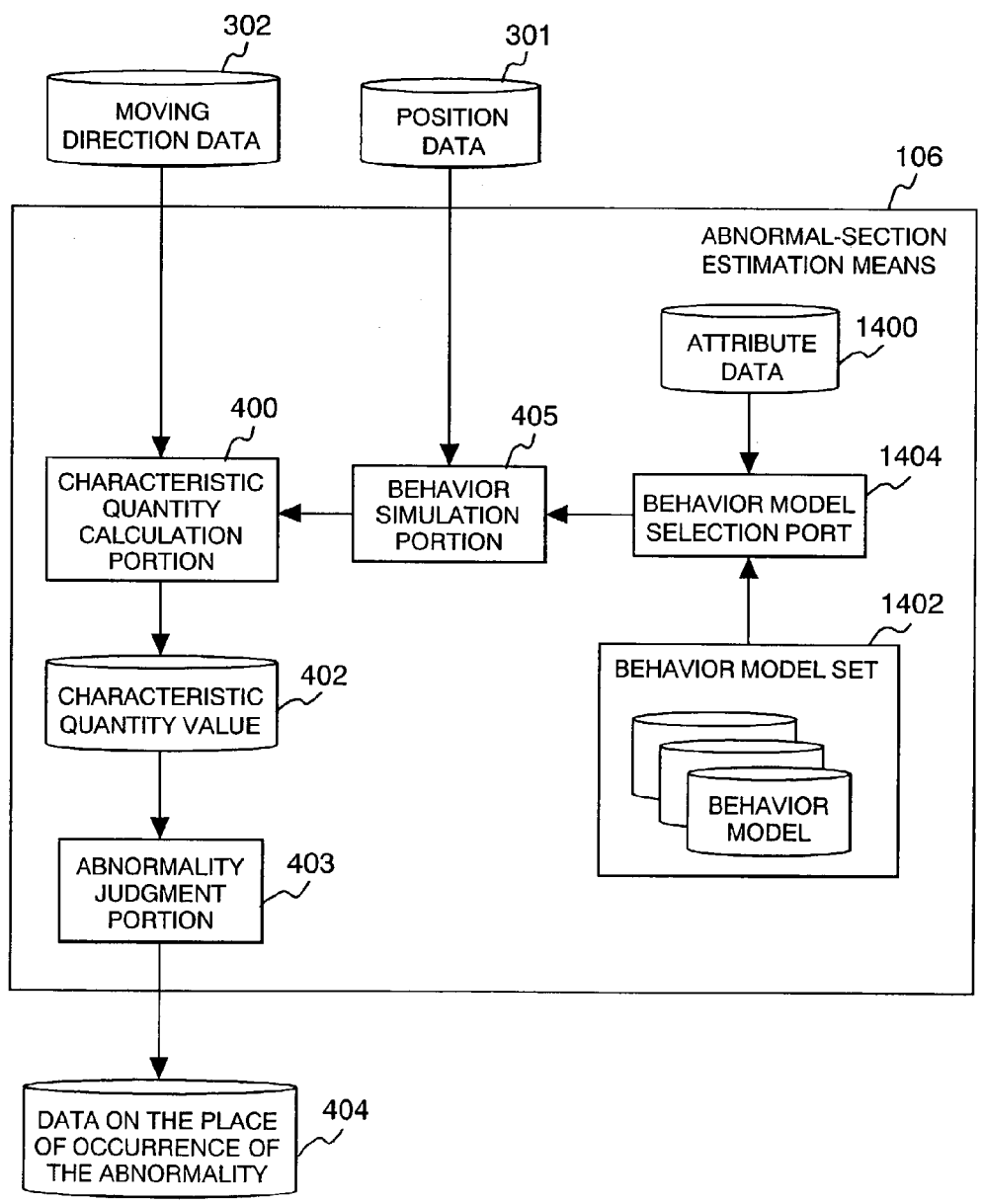
FIG. 14 is a block diagram showing the internal configuration of the abnormality origin estimation means in the case of using a plurality of behavior models.

In order to achieve this purpose, the attribute data 1400, behavior model set 1402, and behavior model selection portion 1404 shown in FIG. 14 can be additionally provided inside the abnormality origin estimation means 106 shown in FIG. 4. The attribute data 1400 is auxiliary information on moving objects, not including path information. For example, information on the exhibition site, station yard, or other monitoring targets to which moving objects belong is to be provided. The user of this monitoring apparatus is to enter such attribute data. Behavior model set 1402, as its name implies, is a set of behavior models. This set of models is to consist of, for example, a behavior model for an exhibition site, a behavior model for a station yard, and other behavior models appropriate for the attribute data 400. The behavior model selection portion 1404 selects from the behavior model set 1402 the appropriate behavior model according to the attribute data relating to the person to be monitored, and delivers the results to the behavior simulation portion 405. Other functions are the same as those described in FIG. 4. It is possible by employing such configuration to calculate more accurate characteristic quantities since the appropriate behavior model is selected according to the particular situation.

Although, in the embodiment described above, abnormality is detected from characteristic quantity data 402 and then the abnormality origin data 404 is sent as the output of the abnormal behavior detector pertaining to the present invention, the data obtained by further providing characteristic quantity data 402 with other additional processing can also be taken as the final output. It is likely to be able to understand the meaning of mass behavior more easily by using characteristic quantity data 402, rather than by using path data and other data concerning the moving objects monitored. The reason is that the characteristic quantity data 402 represents behavioral features and characteristics of the moving objects. For this reason, the case is considered below that after a specific database has been searched with the characteristic quantity data 402 as its key, the results are to be taken as an output.

Figure 15:
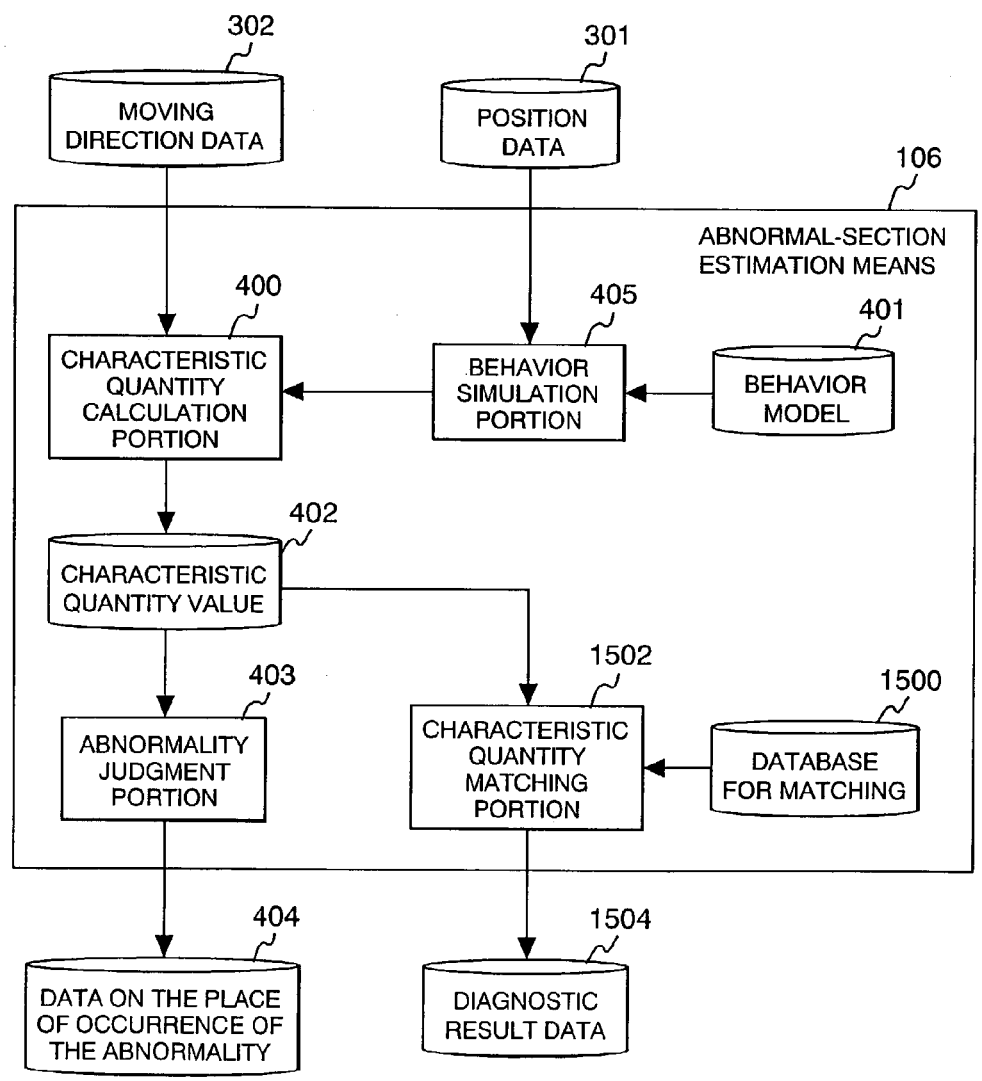
FIG. 15 is a block diagram showing the internal configuration of the abnormality origin estimation means when this means is equipped with a characteristic quantity matching portion.

In that case, such an matching database 1500, characteristic quantity matching portion 1502, and diagnostic result data 1404 as shown in FIG. 15 can be additionally provided inside the abnormality origin estimation means 106 shown in FIG. 4. The information items and characteristic quantities to be searched for are to be linked and the thus-linked information is to be saved in the matching database 1500. For example, the "situation where a group of people is normal" and its characteristic quantity pattern, and the "situation where the group of people is abnormal" and its characteristic quantity pattern, are to be saved in linked form. The characteristic quantity matching portion 1502 searches the matching database 1500 with the characteristic quantity data 402 as the key. A more specific searching method can use, for example, the correlation coefficient set forth on page 740 of the "Handbook of Image Analysis" published by the Tokyo University, Press. This method is intended for the similarity level between two sets of data to be calculated as a correlation coefficient, and in this case, a greater correlation coefficient means a higher similarity level. In the case of this method, the correlation coefficients between a set of characteristic quantity data 402 and the data within a matching database 1000 are calculated and only values greater than the required value are taken as search results. Finally, the search results are saved as matching results 1002. Other functions are the same as those described in FIG. 4.

By adopting such configuration, it is possible for the meaning of the behavior of moving objects to be diagnosed with a higher abstractness level than characteristic quantity data, and in a format more readily understandable to humans.

Next, the case that the abnormal behavior detector pertaining to the present invention is to be applied to the analysis of a sports game is described below using FIG. 16. Full-motion video data from video camera 7 is sent to operation identification process 1 and path extraction process 20. In the path extraction process 20, an object extraction portion extracts players, a ball, and other moving objects from the received video data, and after a labeling portion has identified and tracked individual moving objects, 3D coordinate conversion portion converts the corresponding video coordinates into three-dimensional space coordinates. The results that have thus been obtained are output as path data. Details of the path data are, for example, a chronological record of the position coordinates on the playground where the players and the ball were present.

Figure 16:
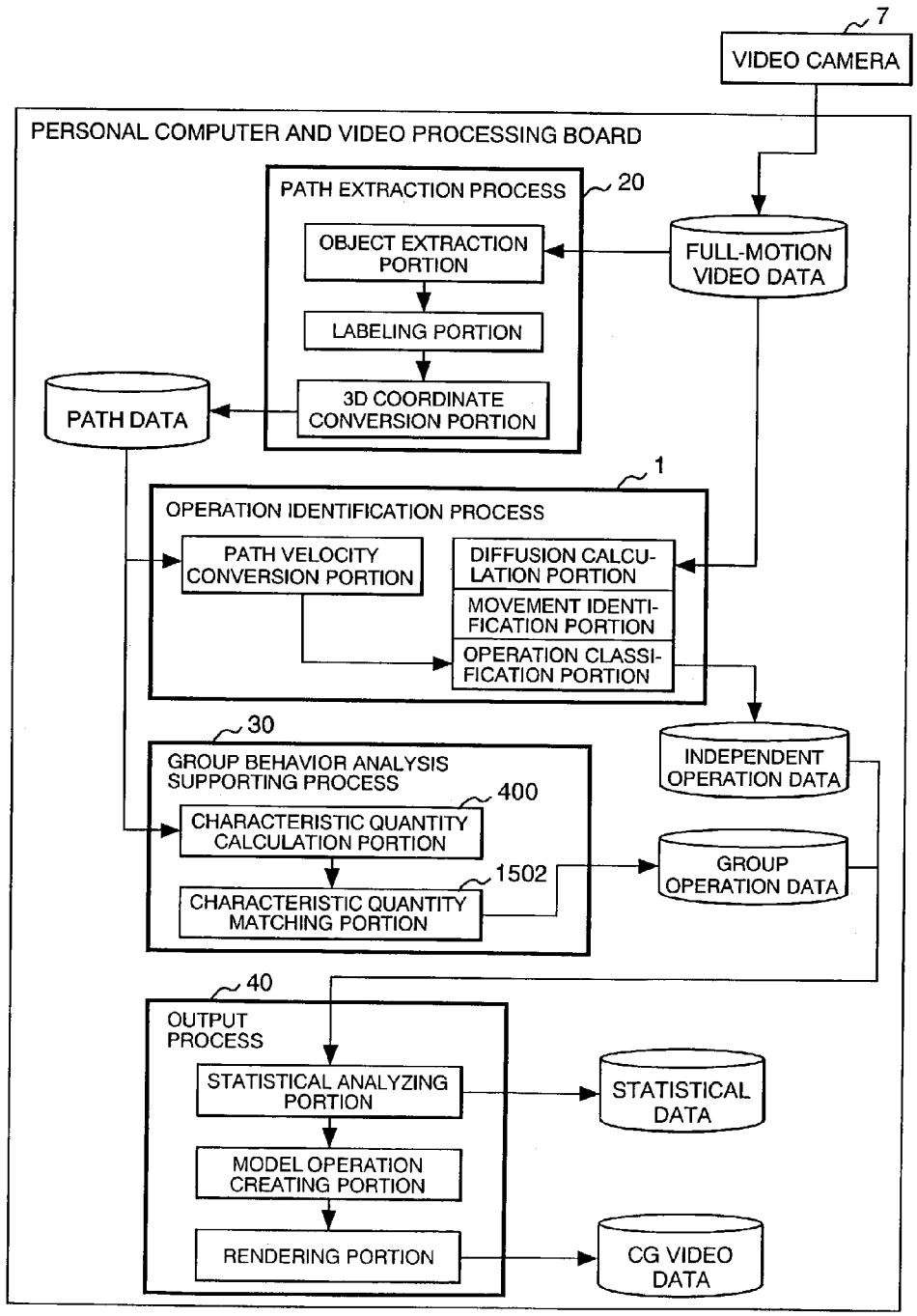
FIG. 16 is a block diagram showing the configuration of a sports game analyzing system which applies the abnormal behavior detector pertaining to the present invention.

Since the operation identification results output from operation identification process 1 represent the independent actions of the players, these results are shown as independent operation data in FIG. 16. In this figure, the identifier denoting the type of action of a player, such as "running" or "standing", is recorded in chronological order. Group behavior analysis supporting process 30 is a portion analyzing the movement of the players as a group, and consists of a characteristic quantity calculation portion 400, which calculates the characteristic quantity of the movement, and a characteristic quantity matching portion 1502, which checks the characteristic quantity.

Group behavior analysis supporting process 30 uses the abnormal behavior detector pertaining to the present invention, and in this process, after path data has been received, the group operation data describing the meaning of the movement of the group is created as an output. An example of the group operation data is an identifier denoting the meaning of the mass behavior in a succor game, such as an "offset trap" or a "cross". This identifier is recorded in chronological order. In output process 40, after independent operation data and group operation data have been received, statistical data is sent from a statistical analyzing portion first. Details of the statistical data are information such as the running distance of each player and the count of crosses, and the information is displayed together with CG video data on a display unit. The model operation creating portion at the next stage refers to a portion that determines the angles of articulation of various joints in order to move a three-dimensional CG type of human body model. The rendering portion creates CG video data from this human body model and outputs the video data as CG video data.

According to the above embodiment of the present invention, since the meaning of mass behavior in mass sports is estimated and displayed, the effect can be obtained that information useful for analyzing sports games can be supplied.

INDUSTRIAL APPLICABILITY

According to the present invention, behavioral features and characteristics of moving objects can be analyzed using only the momentary position and moving direction information of the moving objects, then the place where the abnormal behavior of abnormal objects has been caused can be estimated automatically, and thus the results can be presented to the user of the present detector. Accordingly, the cause of the abnormal behavior of moving objects can be immediately identified from video information that has been obtained during observation.

What is claimed is:

1. An abnormal behavior detector characterized in that it is equipped with a video input means for acquiring video data of moving objects and creating full-motion video data thereof from the acquired source video data, a position/moving direction calculation means for calculating the positions and moving directions of said moving objects from one of the freeze frames of video data included in said full-motion video data, an abnormality origin detection means by which the place of occurrence of the abnormality causing the abnormal behavior of said moving objects is estimated from said positions and moving directions, and an output means for displaying the above-estimated place of occurrence of the abnormality, wherein said abnormal behavior detector is characterized in that the said abnormality origin detection means, after assuming that the behavior of moving objects is governed by both a behavior algorithm which is a judgment procedure concerning the determination of the behavior of the moving objects, and control parameters which are the parameters functioning as the criteria for judgment, estimates said control parameters from said positions and said moving directions and then estimates from said control parameters the object that has caused the abnormal behavior, and wherein said abnormal behavior detector is characterized in that during the calculation of said control parameters, these control parameters are estimated so as to minimize the differences between said moving directions of said moving objects and the virtual moving directions determined by said behavior algorithm.

2. An abnormal behavior detector characterized in that it is equipped with a video input means for acquiring video data of moving objects and creating full-motion video data thereof from the acquired source video data, a position/moving direction calculation means for calculating the positions and moving directions of said moving objects from one of the freeze frames of video data included in said full-motion video data, an abnormality origin detection means by which the place of occurrence of the abnormality causing the abnormal behavior of said moving objects is estimated from said positions and moving directions, and an output means for displaying the above-estimated place of occurrence of the abnormality wherein said abnormal behavior detector is characterized in that said position/moving direction calculation means is equipped with a moving object extraction portion for extracting freeze-frame video data of moving objects from said freeze-frame video data, a typical point calculation portion for calculating the typical points of the moving objects from said freeze-frame video data thereof, a position calculation portion for converting said typical points of the moving objects into three-dimensional positions on a measuring space, and a moving direction calculation portion for calculating the moving directions of the moving objects from said freeze-frame video data thereof, and wherein said abnormal behavior detector is characterized in that said position calculation portion detects the positions of moving objects by calculating, from the coordinates of said moving objects on said freeze-frame video data, the coordinates of said moving objects on said measuring space, on the basis of the calibration data for linking points on said freeze-frame video data and points on any plane of the measuring space.

3. An abnormal behavior detector characterized in that it is equipped with a video input means for acquiring video data of moving objects and creating full-motion video data thereof from the acquired source video data, a position/moving direction calculation means for calculating the positions and moving directions of said moving objects from one of the freeze frames of video data included in said full-motion video data, an abnormality origin detection means by which the place of occurrence of the abnormality causing the abnormal behavior of said moving objects is estimated from said positions and moving directions, and an output means for displaying the above-estimated place of occurrence of the abnormality wherein said abnormal behavior detector is characterized in that said position/moving direction calculation means is equipped with a moving object extraction portion for extracting freeze-frame video data of moving objects from said freeze-frame video data, a typical point calculation portion for calculating the typical points of the moving objects from said freeze-frame video data thereof, a position calculation portion for converting said typical points of the moving objects into three-dimensional positions on a measuring space, and a moving direction calculation portion for calculating the moving directions of the moving objects from said freeze-frame video data thereof, and wherein said abnormal behavior detector is characterized in that said moving direction calculation portion checks freeze-frame video data of the moving objects which have been extracted by said moving object extraction portion, against three-dimensional shape data relating to the extracted moving objects, and then estimates the moving directions of the moving objects.

4. An abnormal behavior detector characterized in that it is equipped with a video input means for acquiring video data of moving objects and creating full-motion video data thereof from the acquired source video data, a position/moving direction calculation means for calculating the positions and moving directions of said moving objects from one of the freeze frames of video data included in said full-motion video data, an abnormality origin detection means by which the place of occurrence of the abnormality causing the abnormal behavior of said moving objects is estimated from said positions and moving directions, and an output means for displaying the above-estimated place of occurrence of the abnormality, wherein said abnormal behavior detector is characterized in that the said abnormality origin detection means, after assuming that the behavior of moving objects is governed by both a behavior algorithm which is a judgment procedure concerning the determination of the behavior of the moving objects, and control parameters which are the parameters functioning as the criteria for judgment, estimates said control parameters from said positions and said moving directions and then not only estimates from said control parameters the object that has caused the abnormal behavior, but also searches for the searching database which links said control parameters to the information items to be searched for.

5. An abnormal behavior detector characterized in that it is equipped with a video input means for acquiring video data of moving objects and creating full-motion video data thereof from the acquired source video data, a position/moving direction calculation means for calculating the positions and moving directions of said moving objects from at least one of the freeze frames of video data included in said full-motion video data, an abnormality origin detection means by which the place of occurrence of the abnormality causing the abnormal behavior of said moving objects is estimated from said positions and moving directions, and an output means for displaying the above-estimated place of occurrence of the abnormality, wherein said abnormal behavior detector is characterized in that said position/moving direction calculation means is equipped with a moving object extraction portion for extracting freeze-frame video data of moving objects from said freeze-frame video data, a typical point calculation portion for calculating the typical points of the moving objects from said freeze-frame video data thereof, a position calculation portion for converting said typical points of the moving objects into three-dimensional positions on a measuring space, and a moving direction calculation portion for calculating the moving directions of the moving objects from said freeze-frame video data thereof, and wherein said abnormal behavior detector is characterized in that said position calculation portion detects the positions of moving objects by calculating, from the coordinates of said moving objects on said freeze-frame video data, the coordinates of said moving objects on said measuring space, on the basis of the calibration data for linking points on said freeze-frame video data and points on any plane of the measuring space.

6. An abnormal behavior detector characterized in that it is equipped with a video input means for acquiring video data of moving objects and creating full-motion video data thereof from the acquired source video data, a position/moving direction calculation means for calculating the positions and moving directions of said moving objects from at least one of the freeze frames of video data included in said full-motion video data, an abnormality origin detection means by which the place of occurrence of the abnormality causing the abnormal behavior of said moving objects is estimated from said positions and moving directions, and an output means for displaying the above-estimated place of occurrence of the abnormality, wherein said abnormal behavior detector is characterized in that said position/moving direction calculation means is equipped with a moving object extraction portion for extracting freeze-frame video data of moving objects from said freeze-frame video data, a typical point calculation portion for calculating the typical points of the moving objects from said freeze-frame video data thereof, a position calculation portion for converting said typical points of the moving objects into three-dimensional positions on a measuring space, and a moving direction calculation portion for calculating the moving directions of the moving objects from said freeze-frame video data thereof, and wherein said abnormal behavior detector is characterized in that said moving direction calculation portion checks freeze-frame video data of the moving objects which have been extracted by said moving object extraction portion, against three-dimensional shape data relating to the extracted moving objects, and then estimates the moving directions of the moving objects.

* * * * *